US012747409B2

(12) United States Patent
Lynch et al.

(10) Patent No.: US 12,747,409 B2
(45) Date of Patent: *Sep. 29, 2026

(54) SOLID DISSOLVABLE COMPOSITIONS

(71) Applicant: The Procter & Gamble Company, Cincinnati, OH (US)

(72) Inventors: Matthew Lawrence Lynch, Mariemont, OH (US); Brandon Philip Illie, Felicity, OH (US); Kristin Rhedrick Williams, West Chester, OH (US); Jocelyn Michelle McCullough, Loveland, OH (US); Jamie Lynn Dria, Deerfield Township, OH (US); Johan Smets, Lubbeek (BE); Vighter Iberi, Mason, OH (US); Karen Diana Hufford, Amelia, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 461 days.

This patent is subject to a terminal disclaimer.

(21) Appl. No.: 18/366,712

(22) Filed: Aug. 8, 2023

(65) Prior Publication Data

US 2024/0052259 A1 Feb. 15, 2024

Related U.S. Application Data

(60) Provisional application No. 63/397,404, filed on Aug. 12, 2022.

(51) Int. Cl.

*C11D 3/50* (2006.01)
*C11D 1/04* (2006.01)

(Continued)

(52) U.S. Cl.

CPC ................ *C11D 1/04* (2013.01); *C11D 3/044* (2013.01); *C11D 3/2068* (2013.01); *C11D 3/505* (2013.01);

(Continued)

(58) Field of Classification Search

CPC ......... C11D 3/2079; C11D 3/50; C11D 3/505; C11D 9/00; C11D 9/02; C11D 9/44;

(Continued)

(56) References Cited

U.S. PATENT DOCUMENTS 3,043,778 A 7/1962 Kelly
4,285,826 A 8/1981 Bertozzi et al.

(Continued)

FOREIGN PATENT DOCUMENTS

CA 3035448 A1 3/2018
EP 3282003 A1 2/2018

(Continued)

OTHER PUBLICATIONS

"Standard For Named Vegetable Oils: Codex Alimentarius", Retrieved from: https://www.fao.org/fao-who-codexalimentarius/sh-proxy/en/?lnk=1&url=https%253A%252F%252Fworkspace.fao.org%252Fsites%252Fcodex%252FStandards%252FCXS%28210-1999%252FCXS210e.pdf, Dec. 31, 2019, 15 Pages.

(Continued)

*Primary Examiner* — Brian P Mruk

(74) *Attorney, Agent, or Firm* — Carolyn S. Powell; James E. Oehlenschlager

(57) ABSTRACT

A solid dissolvable composition comprising a crystallizing agent, water, and a freshness benefit agent.

19 Claims, 10 Drawing Sheets

(51) Int. Cl.

| | |
|---|---|
| ***C11D 3/04*** | (2006.01) |
| ***C11D 3/20*** | (2006.01) |
| ***C11D 9/00*** | (2006.01) |
| ***C11D 9/02*** | (2006.01) |
| ***C11D 9/44*** | (2006.01) |
| ***C11D 11/00*** | (2006.01) |
| ***C11D 13/00*** | (2006.01) |
| ***C11D 13/10*** | (2006.01) |

(52) U.S. Cl.
CPC ....... *C11D 11/0082* (2013.01); *C11D 2111/12* (2024.01)

(58) Field of Classification Search
CPC ..... C11D 11/0082; C11D 13/00; C11D 13/10; C11D 17/0095
See application file for complete search history.

(56) References Cited

U.S. PATENT DOCUMENTS

| | | | | |
|---|---|---|---|---|
| 5,340,492 | A | 8/1994 | Kacher et al. | |
| 5,540,852 | A | 7/1996 | Kefauver et al. | |
| 6,221,829 | B1 | 4/2001 | Symes | |
| 6,562,769 | B1 | 5/2003 | Paatz et al. | |
| 6,825,161 | B2 | 11/2004 | Shefer et al. | |
| 8,389,462 | B2 | 3/2013 | Janszen et al. | |
| 8,754,028 | B2 | 6/2014 | Velazquez | |
| 10,144,903 | B2 | 12/2018 | Amorelli et al. | |
| 11,834,630 | B2 | 12/2023 | Brooker et al. | |
| 2002/0045555 | A1 | 4/2002 | Andreas | |
| 2004/0097387 | A1* | 5/2004 | Taylor ...................... | C11D 3/48 510/146 |
| 2005/0003975 | A1 | 1/2005 | Browne et al. | |
| 2009/0286706 | A1 | 11/2009 | Chakrabarty et al. | |
| 2012/0028874 | A1 | 2/2012 | Fernandez et al. | |
| 2013/0217609 | A1 | 8/2013 | Fernandes et al. | |
| 2013/0281343 | A1 | 10/2013 | Astolfi et al. | |
| 2014/0179587 | A1 | 6/2014 | Brown et al. | |
| 2016/0040096 | A1 | 2/2016 | Smets et al. | |
| 2016/0354504 | A1 | 12/2016 | Sasaki | |
| 2019/0169542 | A1 | 6/2019 | Frankenbach et al. | |
| 2019/0169549 | A1 | 6/2019 | Deflorian | |
| 2019/0276387 | A1 | 9/2019 | Flachsmann | |
| 2020/0095267 | A1 | 3/2020 | Panandiker et al. | |
| 2020/0330948 | A1 | 10/2020 | Cardoso et al. | |
| 2020/0330949 | A1 | 10/2020 | Cardoso et al. | |
| 2020/0406218 | A1 | 12/2020 | Berthier et al. | |
| 2021/0277327 | A1 | 9/2021 | Panandiker et al. | |
| 2021/0315783 | A1 | 10/2021 | Lynch et al. | |
| 2021/0315812 | A1 | 10/2021 | Lynch et al. | |
| 2021/0339217 | A1 | 11/2021 | Feng | |
| 2022/0010245 | A1 | 1/2022 | Lynch et al. | |
| 2022/0098528 | A1 | 3/2022 | Agarkhed et al. | |
| 2022/0118287 | A1 | 4/2022 | Cetti et al. | |
| 2022/0118417 | A1 | 4/2022 | Smith et al. | |
| 2022/0119743 | A1 | 4/2022 | Barros et al. | |
| 2022/0177813 | A1 | 6/2022 | Natoli et al. | |
| 2024/0060013 | A1 | 2/2024 | Lynch | |
| 2024/0252682 | A1 | 8/2024 | Altshuler et al. | |
| 2024/0372208 | A1 | 11/2024 | Jang et al. | |

FOREIGN PATENT DOCUMENTS

| | | | | |
|---|---|---|---|---|
| EP | 3459622 A1 | 3/2019 | | |
| EP | 3736320 A1 | 11/2020 | | |
| EP | 3233200 B1 | 9/2021 | | |
| JP | S63248899 A | 10/1988 | | |
| JP | 2003064400 A | 3/2003 | | |
| JP | 2004331592 A | 11/2004 | | |
| JP | 2014213072 A | 11/2014 | | |
| WO | 9209679 A1 | 6/1992 | | |
| WO | 9216610 A1 | 10/1992 | | |
| WO | 2014037167 A1 | 3/2014 | | |
| WO | 2020260598 A1 | 12/2020 | | |
| WO | 2021123018 A1 | 6/2021 | | |
| WO | WO 2021/123018 * | 6/2021 | ............... | C11D 3/50 |
| WO | 2021207440 A1 | 10/2021 | | |
| WO | 2022017888 A1 | 1/2022 | | |
| WO | 2022122878 A1 | 6/2022 | | |

OTHER PUBLICATIONS

16322M PCT Search Report and Written Opinion for PCT/US2023/071804.
All Office Actions; U.S. Appl. No. 18/366,709, filed Aug. 8, 2023.
All Office Actions; U.S. Appl. No. 18/366,710, filed Aug. 8, 2023.
All Office Actions; U.S. Appl. No. 18/366,713, filed Aug. 8, 2023.
All Office Actions; U.S. Appl. No. 18/366,714, filed Aug. 8, 2023.
All Office Actions; U.S. Appl. No. 18/366,715, filed Aug. 8, 2023.
All Office Actions; U.S. Appl. No. 18/366,717, filed Aug. 8, 2023.
All Office Actions; U.S. Appl. No. 18/366,719, filed Aug. 8, 2023.
All Office Actions; U.S. Appl. No. 18/366,730, filed Aug. 8, 2023.
All Office Actions; U.S. Appl. No. 18/366,736, filed Aug. 8, 2023.
Unpublished U.S. Appl. No. 18/366,709, filed Aug. 8, 2023, to Matthew Lawrence Lynch et al.
Unpublished U.S. Appl. No. 18/366,710, filed Aug. 8, 2023, to Matthew Lawrence Lynch et al.
Unpublished U.S. Appl. No. 18/366,713, filed Aug. 8, 2023, to Matthew Lawrence Lynch et al.
Unpublished U.S. Appl. No. 18/366,714, filed Aug. 8, 2023, to Matthew Lawrence Lynch et al.
Unpublished U.S. Appl. No. 18/366,715, filed Aug. 8, 2023, to Matthew Lawrence Lynch et al.
Unpublished U.S. Appl. No. 18/366,717, filed Aug. 8, 2023, to Matthew Lawrence Lynch et al.
Unpublished U.S. Appl. No. 18/366,719, filed Aug. 8, 2023, to Matthew Lawrence Lynch et al.
Unpublished U.S. Appl. No. 18/366,730, filed Aug. 8, 2023, to Matthew Lawrence Lynch et al.
Unpublished U.S. Appl. No. 18/366,736, filed Aug. 8, 2023, to Matthew Lawrence Lynch et al.

* cited by examiner

SOLID DISSOLVABLE COMPOSITIONS

This application claims the benefit of Provisional Ser. No. 63/397,404, filed Aug. 12, 2022.

FIELD OF THE INVENTION

Solid dissolvable compositions (SDC) comprising a mesh microstructure formed from dry sodium fatty acid carboxylate formulations containing high levels of freshness benefit agents, which dissolve at different times over a range of washer conditions, such as temperature to deliver extraordinary freshness to fabrics.

BACKGROUND OF THE INVENTION

The formulation of effective solid dissolvable compositions presents a considerable challenge. The compositions need to be physically stable, temperature resistant and humidity resistant, yet still be able to perform the desired function by dissolving, in solution and leaving little or no material behind. Solid dissolvable compositions are well known in the art and have been used in several roles, such as detergents, oral and body medications, disinfectants, and cleaning compositions.

Compositions useful as solid disinfectants and cleansers are well known in several contexts, i.e., as detergents, bleaches, and the like. Machine dishwashing tablets are popular with the consumer as they have several advantages over powdered products, in that they do not require measuring and. are compact and easy to store. However, a recurring problem with machine dishwashing tablets is obtaining a tablet that dissolves quickly when added to the wash, without the need to flow-wrap the tablets so they do not crumble on transport and storage. A further issue with tablets is that they are often formed through compression, which can damage tablet components, such as encapsulated actives.

Attempts to optimize the performance of tablet technology have primarily been directed towards modification of the dissolution profile of tablets. This is deemed especially important for those tablets that are placed in the machine, such that they encounter a water spray at the very beginning of the wash process. EP-A-264,701 describes machine dish washing tablets comprising anhydrous and hydrated metasilicates, anhydrous triphosphate, active chlorine compounds and a tableting aid consisting of a mixture of sodium acetate and spray-dried sodium zeolite.

In recent years, tablets for oral consumption have been produced by subjecting tablet components to compressive shaping under high pressure in a dry state. This is because tablets are essentially intended to be disintegrated in the gastrointestinal tract to cause drug absorption and must be physically and chemically stable from completion of tableting to reach to the gastrointestinal tract, so that the tablet components must be strongly bound together by a compressive pressure. In early times, wet tablets were available, which were molded and shaped into tablets while in a wet state, followed by drying. However, such tablets were not rapidly soluble in the oral cavity because they were intended to be disintegrated in the gastrointestinal tract. Also, these tablets are not strongly compressed mechanically and lack shape retention and are not practically applicable to modern use.

Tablets formed by compression under low compression force also dissolve more rapidly than tablets formed by high compression force. However, tablets produced by these processes have a high degree of friability. Crumbling and breakage of tablets prior to ingestion may lead to uncertainty as to the dosage of active ingredient per tablet. Furthermore, high friability also causes tablet breakage leading to waste during factory handling.

Another form of solid dissolvable compositions are sheet-like articles, for example sheet-like laundry detergent articles that are completely or substantially soluble in water have been known in the art. Unlike liquid laundry detergent these laundry detergent sheets contain little or no water. They are chemically and physically stable during shipment and storage and have a significantly smaller physical and environmental footprint. In recent years, these sheet-like laundry detergent articles have made significant progress in various aspects, including increased surfactant contents by employing polyvinyl alcohol (PVA) as the main film former and improved processing efficiency by employing a rotating drum drying process. Consequently, they have become more and more commercially available and popular among consumers.

However, such sheet-like laundry detergent articles still suffer from significant limitation on the types of surfactants that can be used, because only a handful of surfactants (such as alkyl sulfates) can be processed. to form sheets on a rotating drum dryer. When other surfactants are incorporated into the sheet-like laundry detergent articles, the resulting articles may exhibit undesirable attributes (e.g., slow dissolution and undesired caking). Such limited choice of surfactants that can be used in the sheet-like laundry detergent articles in turn leads to poor cleaning performances, especially in regions where fabrics or garments are exposed to a variety of soils that can only be effectively removed by different surfactants with complementary cleaning powers.

The chain length distributions used in soap bars are balanced to achieve both firmness (i.e., solid) and lathering. Chain lengths from vegetable-based oils contain both saturated C12 and C14 fatty acids and also often a plurality of unsaturated C18:1 and C18:2 fatty acids. By themselves, these compositions lather (which is not good for use in laundry washing machines) and result in liquid, soft or compositions which do not hold a shape, especially in the presence of water in excess of 5 wt. %. C14 and unsaturated chain length fatty acids are generally considered insoluble or softening, and to be avoided in solid dissolvable compositions described herein. Fatty acid chain lengths from animal-based oils that contain saturated C16 and C18 fatty acids are blended with vegetable-based oils to create firm bars. However, these longer chain length fatty acids are generally considered insoluble.

Traditional soap bar compositions are solid, and generally blend a wide variety of sodium fatty carboxylates with different counter ions, to achieved properties associated with good-performing soap bars. For example, U.S. Pat. No. 5,540,852 describes a mild lathering soap bar containing 50 wt. %-80 wt. % combined NaC14, NaC16, and NaC18 and fraction of magnesium counter ion soap. The presence of both the very long chain length fatty acids and magnesium ions results in compositions that have plate structures (i.e., no longer fibers) and do not dissolve completely in a wash cycle. GB 2243615 A describes a beta-phase soap bar containing long chain length (e.g., large titer) and unsaturated (e.g., large IV value) sodium fatty acid carboxylates resulting in compositions do not efficiently crystallize and which do not dissolve completely U.S. Pat. No. 3,926,828 describes transparent bar soaps containing long chain length sodium soap including NaC14, NaC16 and NaC18, triethanolamine counter ions and branched-chain fatty acid, providing compositions which have non-fiber morphologies that do not efficiently form crystals.

US 2004/0097387 A1 describes an anti-bacterial soap bar comprising C8 and C10 soap, but substantially free of C12 soap having a substantial amount of hydridic solvent—or water-soluble organic solvent such as propylene glycol, and free, un-neutralized fatty acid. The presence of hydridic solvents and un-neutralized fatty acid are known to change the morphology of fatty acid. carboxylate salts. The altered crystal morphology adversely affects the dissolution properties of any resulting microstructure of the crystal mass. Further, hydridic solvents are hygroscopic. Any crystal masses which incorporate them will thus readily absorb moisture from the air making them inherently susceptible to supply chain instabilities by making the compositions tacky and sticky, both of which are undesirable.

Traditional laundry compositions blend a wide variety of sodium fatty carboxylates to achieve properties associated with good-performing laundry bars. In WO 20221122878 A1 a laundry soap bar composition, has substantial amounts (85-90 wt. %) of C14 or greater chain length of soap, high levels of water and about one-half fatty acid (i.e. un-neutralized), leading to acid-soap crystals which are non-fiberous and compositions that do not dissolve completely. US 2007/0293412 A1 describes a powder soap composition containing combinations of NaC12, NaC14, and NaC16 sodium fatty acid carboxylate and potassium counterions, the very long chain fatty acids result in compositions that do not dissolve completely in a wash cycle and potassium ions result in crystallizing agents which have plate structures (i.e., no longer fibers).

Further, U.S. Pat. No. 11,499,123 B2 and US 2023/0037154 A1 describe various water-soluble pellets comprising vegetable soap (e.g., coconut soap), freshness actives and other ingredient to facilitate preparation through an extruder process. Dominant microstructures present in Example 1, for example, from both specifications are primarily lamella sheets and lamellar-like vesicle structures (FIG. 1A and FIG. 1B). Preparing vegetable soaps as described in the specifications—in a manner common to vegetable soap making, results in the presence of multiple phases consistent with traditional soap boiling (R. G. Laughlin, The Aqueous Phase Behavior of Surfactants, Academic Press, 1994, section 14.4). The presence of the lamella sheets and lamellar-like vesicle microstructures has numerous deleterious effects on the final compositions, including making soft compositions, which are easily deformed and pellets of high density. These composition also exhibit other unacceptable properties, such as susceptibility to humidity.

Finally, there are compositions that are designed to be stable in the presence of significant amounts of water. For example, US 2021/0315783 A1 describes a composition having NaC14, NaC16 and NaC18 fatty acid carboxylates such that the crystallizing agents form a network that express water when compressed. US 2002/0160088 A1 describes C6-C30 aliphatic metal carboxylates that form fiber networks in the presence of water and seawater, to soak up oil. (US 2021/0315784 A1) describes the use of long chain (C13-C20) sodium carboxylate fatty acid to prepare compositions that squeeze out water when compressed. These compositions require the use of longer chain length fatty acids (i.e., not water-soluble).

What is needed is a solid composition that overcomes the shortcomings of the prior art and that can comprise high levels of active, dissolves readily, yet is temperature and humidity resistant, allowing for supply chain stability.

SUMMARY OF THE INVENTION

A solid dissolvable composition is provided that comprises crystallizing agent; water; and freshness benefit agent; wherein the crystallizing agent is the sodium salt of saturated fatty acids having from 8 to about 12 methylene groups; wherein the freshness benefit agent is at least one of a neat perfume or a malodor counteractant.

A solid dissolvable composition (SDC) comprising crystallizing agent and high levels of freshness benefit agents; wherein, the composition and microstructure enables dissolution rate greater than 5% at (1 min) at solubility temperature at 37° C. and more preferably dissolution rate greater than 5% at (1 min) at solubility temperature at 25° C. by the DISSOLUTION TEST METHOD for desired dissolution profiles under wash conditions; wherein, the composition and microstructure enables very high loading of perfume capsules and neat perfume to deliver extraordinary freshness to fabrics versus current market product. Solid dissolvable compositions, have low packing density and are porous, to enhance dissolution, and result in enhanced very-light product for e-commerce. The compositions are also composed of natural, available, relatively inexpensive, and sustainable materials, resistant to humidity and elevated temperature to enhance stability in the supply chain.

A method of producing a solid dissolvable composition is provided that comprises providing at least one of a neat perfume or a malodor counteractant; mixing a solid dissolvable composition mixture, by solubilizing a crystallizing agent in water; forming, by converting and maintaining the solid dissolvable composition mixture into the desire shape and size by at least one of crystallization, partial drying, salt addition or viscosity build from liquid crystal formation; and drying, by removing water to produce a solid dissolvable composition.

A method of producing a solid dissolvable composition is provided that comprises solubilizing a crystallizing agent in a solid dissolvable composition mixture (SDCM) by heating the crystallizing agent and the aqueous phase until the crystallizing agent is solubilized, and optionally adding freshness benefit agent often when somewhat cooled (i.e., Mixing); forming a rheological solid composition (RSC) in one embodiment by further cooling the solid dissolvable composition mixture to below the crystallization temperature to crystallizing the crystallizing agent (i.e., Forming); producing the solid dissolvable composition (SDC) by removing water and adding an optional freshness benefit agent (i.e., Drying).

Perfume capsules can be added when the mixtures when cool (i.e., Mixing) and without the application of compressive and shear stresses, that otherwise break the walls of capsules, thus releasing the perfumes. Perfumes can be optionally added by emulsification in the mixing stage, where perfume drops are stabilized by leveraging the surfactant properties of the crystallizing agents prior to formation of the fiber microstructure of the first-formed rheological solid or can be optionally added after the drying stage and formation of the solid dissolvable composition, to seep evenly into the fiber microstructure.

BRIEF DESCRIPTION OF THE DRAWINGS

While the specification concludes with claims particularly pointing out and distinctly claiming the subject matter that is regarded as the present disclosure, it is believed that the disclosure will be more fully understood from the following description taken in conjunction with the accompanying drawings. Some of the figures may have been simplified by the omission of selected elements for the purpose of more clearly showing other elements. Such omissions of elements in some figures are not necessarily indicative of the presence or absence of elements in any of the exemplary embodiments, except as may be explicitly delineated in the corresponding written description. None of the drawings are necessarily to scale.

DETAILED DESCRIPTION OF THE INVENTION

Figure 1A:
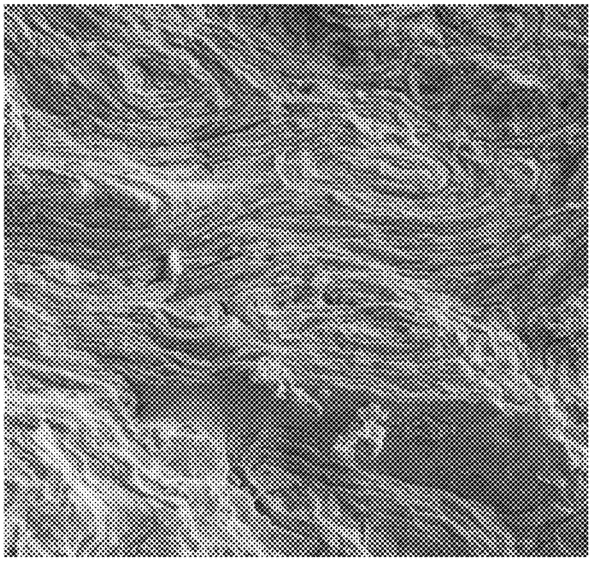
FIG. 1A shows a representative Scanning Electron Micrograph (SEM) of comparative microstructure prepared from coconut oil.
Figure 1B:
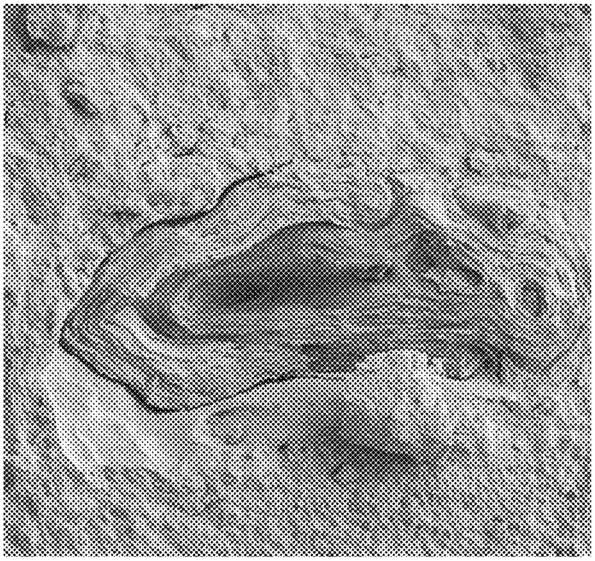
FIG. 1B shows a representative Scanning Electron Micrograph (SEM) of comparative microstructure prepared from hydrogenated coconut oil.

The present invention includes a solid dissolvable composition comprising a crystalline mesh. The crystalline mesh ("mesh") comprises a relatively rigid, three-dimensional, interlocking crystalline skeleton framework of fiber-like crystalline particles formed from crystallizing agents. The solid dissolvable compositions of the present invention have crystallizing agent(s), a low water content, freshness benefit agent(s), and are easily dissolvable in water at or above/ below room temperature.

While not being limited to theory it is believed that counter ions in the fatty acid compositions of the present invention help to provide the unique performance characteristics of the disclosed compositions and are explained in more detail below. Sodium counter ions result in fiber crystals of the fatty acid carboxylates that form a mesh microstructure. This mesh microstructure ensures rapid dissolution and provides an added advantage of a low-density composition which is advantageous fir lowering shipping costs. With other counter ions such as potassium, magnesium and triethanolamine, fatty acid carboxylates form plate-like crystals, that make dry compositions comprising them either crumbly or difficult to dissolve. Counter ions for non-performing solid dissolvable compositions can be introduced either through the use of a strong alkali agent other than sodium hydroxide (e.g., potassium hydroxide) or introduced separately as an added salt, such as potassium chloride or magnesium chloride. Use of counterions other than sodium, generally do not generate a mesh structure that provides the performance characteristics of the disclosed compositions.

The disclosed inventive solid dissolvable compositions comprise lower chain length (C8-C12) sodium fatty acid carboxylates.

The present invention may be understood more readily by reference to the following detailed description of illustrative compositions. It should be understood that the scope of the claims is not limited to the specific products, methods, conditions, devices, or parameters described herein, and that the terminology used herein is not intended to be limiting of the claimed invention. "Solid Dissolvable Composition" (SDC), as used herein comprises crystallizing agents of sodium fatty acid carboxylate which, when processed as described in the specification, form an interconnected crystalline mesh of fibers that readily dissolve at target wash temperatures, optional freshness benefit agent, and 10 wt % or less of the water. SDC is in a solid form, such as a powder, a particle, an agglomerate, a flake, a granule, a pellet, a tablet, a lozenge, a puck, a briquette, a brick, a solid block, a unit dose, or other solid form known to those of skill in the art. Herein, a 'bead' is a particular solid form, having a hemi-spherical shape with about a 2.5 mm radius.

"Solid Dissolvable Composition Mixture" (SDCM), as used herein comprises the components of a solid dissolvable composition prior to water removal (for example, during the mixture stage or crystallization stage). The SDCM comprises an aqueous phase, further comprising an aqueous carrier. The aqueous carrier may be distilled, deionized, or tap water. The aqueous carrier may be present in an amount of about 65 wt % to 99.5 wt %, alternatively about 65 wt % to about 90 wt %, alternatively about 70 wt % to about 85 wt %, alternatively about 75 wt %, by weight of the SDCM.

"Rheological Solid Composition" (RSC), as used herein describes the solid form of the SDCM after the crystallization (crystallization stage) before water removal to give an SDC, wherein the RSC comprises greater than about 65 wt % water, and the solid form is from the 'structured' mesh of interlocking (mesh microstructure), fiber-like crystalline particles from the crystallizing agent.

"Freshness benefit agent", as used herein and further described below, includes material added to an SDCM, RSC, or SDC to impart freshness benefits to fabric through a wash. In embodiments, a freshness benefit agent may be a neat perfume; in embodiments, a freshness benefit agent may be an encapsulated perfume (perfume capsule); in embodiments, a freshness benefit agent may be a mixture of perfume and/or perfume capsules.

"Crystallization Temperature", as used herein to describe the temperature at which a crystallizing agent (or combination of crystallizing agents) are completely solubilized in the SDCM; alternatively, herein to describe the temperature at which a crystallizing agent (or combination of crystallizing agents) show any crystallization in the SDCM.

"Dissolution Temperature", as used herein to describe the temperature at which an SDC is completely solubilized in water under normal wash conditions.

"Stability Temperature", as used herein is the temperature at which most (or all) of the SDC material completely melts, such that a composition no longer exhibits a stable solid structure and may be considered a liquid or paste, and the solid dissolvable composition no longer functions as intended. The stability temperature is the lowest temperature thermal transition, as determined by the THERMAL STABILITY TEST METHOD. In embodiments of the present invention the stability temperature may be greater than about 40° C., more preferably greater than about 50° C., more preferably greater than about 60° C., and most preferably greater than about 70° C., to ensure stability in the supply chain. One skilled in the art understands how to measure the lowest thermal transition with a Differential Scanning Calorimetry (DSC) instrument.

"Humidity Stability", as used herein is the relative humidity at which the low water composition spontaneously absorbs more than 5 wt % of the original mass in water from the humidity from the surrounding environment, at 25° C. Absorbing low amounts of water when exposed to humid environments enables more sustainable packaging. Absorbing high amounts of water risks softening or liquifying the composition, such that it no longer functions as intended. In embodiments of the present invention the humidity stability may be above 70% RH, more preferably above 80% RH, more preferably above 90% RH, the most preferably above 95% RH. One skilled in the art understands how to measure 5% weight gain with a Dynamic Vapor Sorption (DVS/) instrument, further described in the HUMIDITY TEST METHOD.

"Cleaning composition", as used herein includes, unless otherwise indicated, granular or powder-form all-purpose or "heavy-duty" washing agents, especially cleaning detergents; liquid, gel or paste-form all-purpose washing agents, especially the so-called heavy-duty liquid types; liquid fine-fabric detergents; hand dishwashing agents or light duty dishwashing agents, especially those of the high-foaming type; machine dishwashing agents, including he various pouches, tablet, granular, liquid and rinse-aid types for household and institutional use; liquid cleaning and disinfecting agents, including antibacterial hand-wash types, cleaning bars, mouthwashes, denture cleaners, dentifrice, car or carpet shampoos, bathroom cleaners; hair shampoos and hair-rinses; shower gels and foam baths and metal cleaners; as well as cleaning auxiliaries such as bleach additives and "stain-stick" or pre-treat types, substrate-laden products such as dryer added sheets, dry and wetted wipes and pads, nonwoven substrates, and sponges; as well as sprays and mists.

"Dissolve during normal use", as used herein means that the solid dissolvable composition completely or substantially dissolves during the wash cycle. One skilled in the art recognizes that washing cycles have a broad range of conditions (e.g., cycle times, machine types, wash solution compositions, temperatures). Suitable compositions completely or substantially dissolve in at least at one of these conditions. Suitable compositions and microstructures enable dissolution rates greater than $M_A$>5% at solubility temperature at 37° C. and more preferably dissolution rates greater than $M_A$>5% solubility temperature at 25° C. by the DISSOLUTION TEST METHOD for desired dissolution profiles under wash conditions.

As used herein, the term "bio-based" material refers to a renewable material.

As used herein, the term "renewable material" refers to a material that is produced from a renewable resource. As used herein, the term "renewable resource" refers to a resource that is produced via a natural process at a rate comparable to its rate of consumption (e.g., within a 100-year time frame). The resource can be replenished naturally, or via agricultural techniques. Non-limiting examples of renewable resources include plants (e.g., sugar cane, beets, corn, potatoes, citrus fruit, woody plants, lignocellulose, hemicellulose, cellulosic waste), animals, fish, bacteria, fungi, and forestry products. These resources can be naturally occurring, hybrids, or genetically engineered organisms. Natural resources, such as crude oil, coal, natural gas, and peat, which take longer than 100 years to form, are not considered renewable resources. Because at least part of the material of the invention is derived from a renewable resource, which can sequester carbon dioxide, use of the material can reduce global warming potential and fossil fuel consumption.

As used herein, the term "bio-based content" refers to the amount of carbon from a renewable resource in a material as a percent of the weight (mass) of the total organic carbon in the material, as determined by ASTM D6866-10 Method B.

The term "solid" refers to the physical state of the composition under the expected conditions of storage and use of the solid dissolvable composition.

As used herein. the articles including "a" and "an" when used in a claim, are understood to mean one or more of what is claimed or described.

As used herein,"include", "includes" and "including" are meant to be non-limiting.

Unless otherwise noted, all component or composition levels are in reference to the active portion of that component or composition, and are exclusive of impurities, for example, residual solvents or by-products, which may be present in commercially available sources of such components or compositions.

All percentages and ratios are calculated by weight unless otherwise indicated. All percentages and ratios are calculated based on the total composition unless otherwise indicated.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Figure 2A:
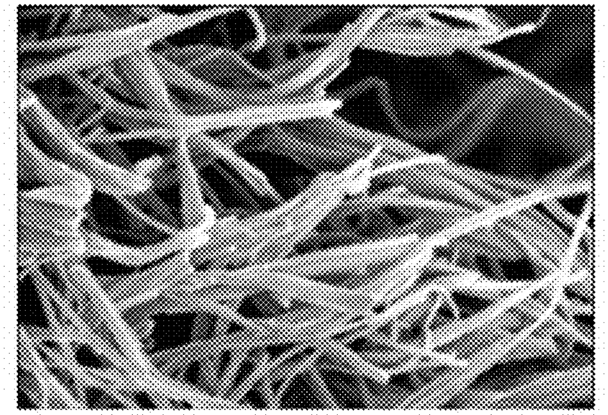
FIG. 2A shows Scanning Electron Micrograph (SEM) of crystallization agent crystals of crystallization agent in an inventive composition.
Figure 2B:
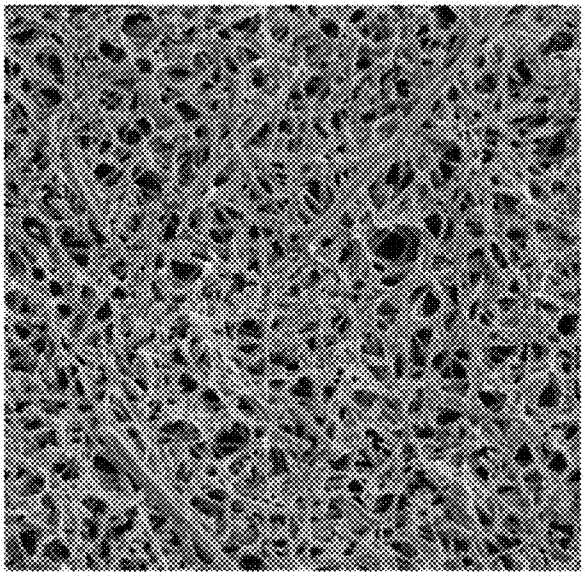
FIG. 2B shows Scanning Electron Micrograph (SEM) of mesh microstructure made from crystallized crystallization agent, in the DSC domains in an inventive composition.
Figure 3A:
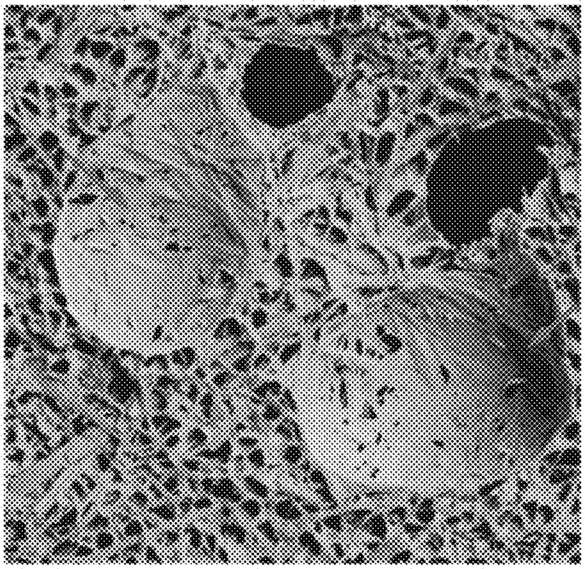
FIG. 3A shows Scanning Electron Micrograph (SEM) of viable perfume capsules dispersed in the mesh microstructure of the DSC domain, inventive Example CB with PMC capsules.
Figure 3B:
FIG. 3B shows Scanning Electron Micrograph (SEM), of perfume capsules dispersed in the mesh microstructure of the SDC domains, inventive Example CB with PMC capsules.

The solid dissolvable compositions (SDC) comprise fibrous interlocking crystals (FIGS. 2A and 2B) with sufficient crystal fiber length and concentration to form a mesh microstructure. The mesh allows the SDC to be solid, with a relatively small amount of material. The mesh also allows the entrapment and protection of particulate active agents, such as freshness benefits agents, such as perfume capsules (FIGS. 3A and 3B). In embodiments, an active agent, such as a freshness benefit active may be a discrete particle have a diameter of less than 100 μms, preferably less than 50 μms and more preferably less than 25 μms, such as perfume capsules. Further, an active agent, such as a freshness benefit agent may be liquid freshness benefits agents, such as neat perfumes. The voids in the mesh microstructure allows very high levels of active agent inclusion. In embodiments, one can preferably add up to about 15 wt. % active agent, preferably between about 15 wt. % and about 0.01%, preferably between about 15 wt. % and about 0.5 wt. %, preferably between about 15 wt. % and about 2 wt. %, most preferably between about 15 wt. % and about 2 wt. %. The voids also provide a pathway for water to entrain into the microstructure during washing to speed the dissolution relative to completely solid compositions.

It is surprising that it is possible to prepare SDC that have high dissolution rates, low water content, humidity resistance, and thermal stability. Sodium salts of long chain length fatty acids (i.e., sodium myristate (NaC14) to sodium stearate (NaC18) can form fibrous crystals. It is generally understood that the crystal growth patterns leading to a fibrous crystal habit reflect the hydrophilic (head group) and hydrophobic (hydrocarbon chain) balance of the NaC14-NaC18 molecules. As disclosed in this application, while the crystallizing agents used have the same hydrophilic contribution, they have extraordinarily different hydrophobic character owing to the shorter hydrocarbon chains of the employed sodium fatty acid carboxylates. In fact, carbon chains are about one-half the length of those previous disclosed (US2021/0315783A1). Further, one skilled in the art recognizes that many surfactants such as ethoxylated alcohols are subject to significant uptake of humidity and subject to significant temperature induced changes, having the same chains but different head groups. The select group of crystallizing agents in this invention enables all these useful properties.

Figure 4:
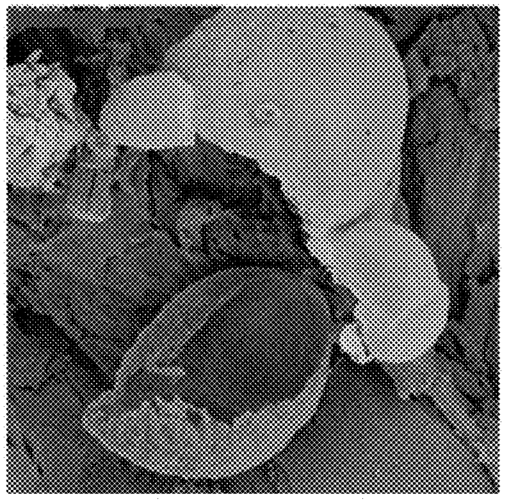
FIG. 4 shows Scanning Electron Micrograph (SEM) of broken perfume capsules as a result of pressure used to make a conventional compressed tablet.
Figure 5A:
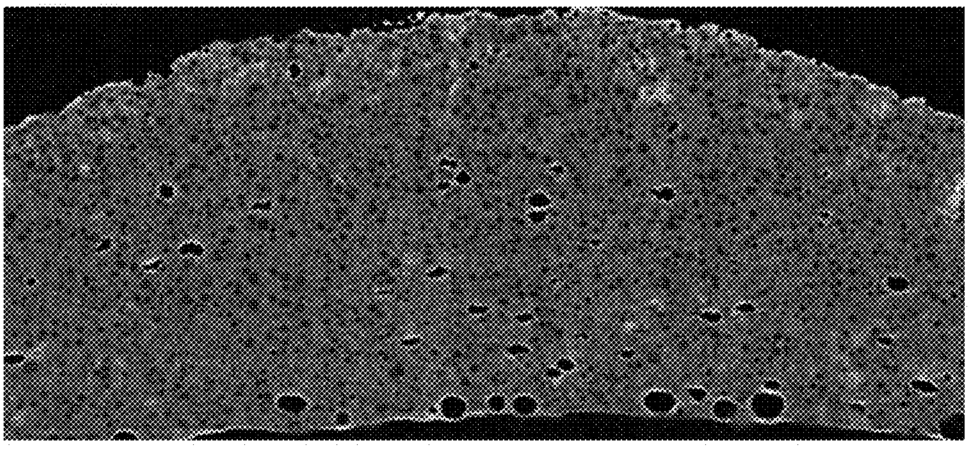
FIG. 5A shows a Micro Computed Tomography (micro-CT) image of inventive SDC prepared through described process, leaving the composition with many open holes (black and gray regions) in the microstructure to facilitate dissolution.
Figure 5B:
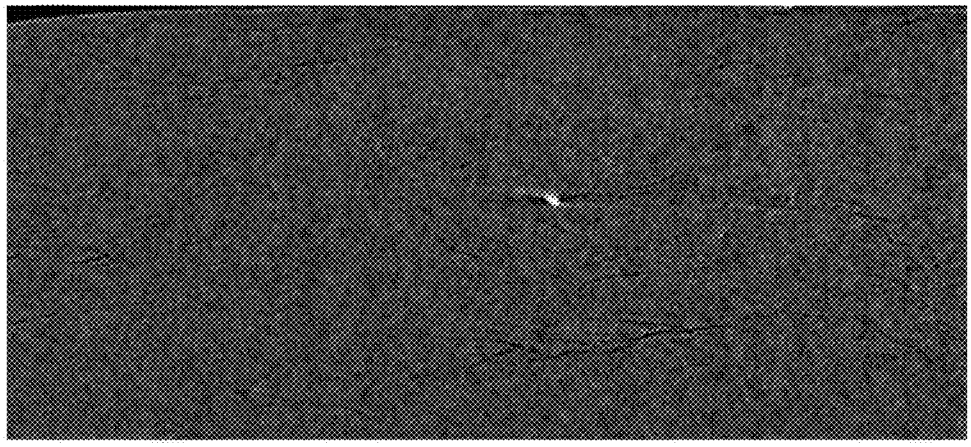
FIG. 5B shows Micro Computed Tomography (micro-CT) image of conventional compressed tablet with completely solid structure.

The method of producing a solid dissolvable composition offers several advantages over other approaches. First—as previously noted, making similar compositions through compression (e.g., tablet making) and potentially extrusion has a deleterious effect on dispersed perfume capsules. The process of making tablets compresses the solid materials and—not wishing to be bound be theory, results in significant local strains in the material, which break the perfume capsules and releases the enclosed perfumes (FIG. 4). Second, making similar compositions through compression (e.g., tablet making) also compresses the structures making them more dense and more difficult to dissolve (FIGS. 5A and 5B). Third, the predominant commercial fabric freshness bead making process limits the selection of freshness benefit agents. The polyethylene glycol (PEG) used to form most current commercial beads must be processed above the melting point of the PEG (between 70° C.-80° C.); preparing SDC's at about 25° C. allows for a wider variety of neat perfumes and perfume capsules. In practical processes, temperatures at the melting point of the PEG must be maintained for hours, and some perfume raw materials are exceptionally volatile, and will flash off during processing. The inclusion of perfume oil for SDC is done at room temperature, thus opening a wider range of perfume raw materials for addition as neat perfume. Finally, many perfume capsule wall chemistries will fail at the higher process temperatures causing them to prematurely release perfumes, thus making them ineffective as a freshness benefit active. By enabling lower temperature process conditions, the SDC compositions described herein make it possible to use a broader range of capsule wall chemistries.

Figure 6:
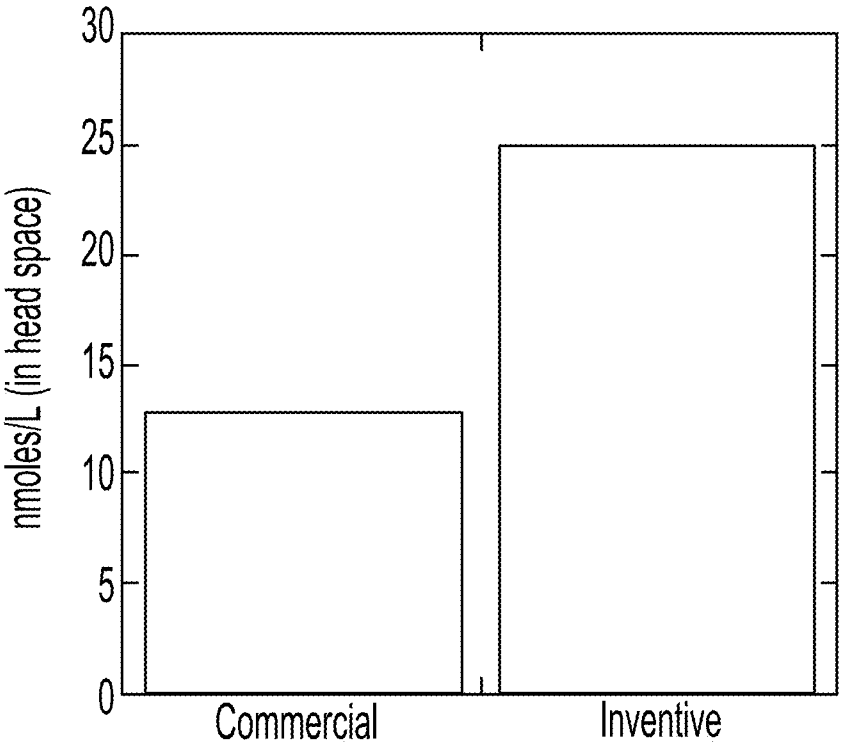
FIG. 6 is a graph showing quantity of perfume in the head space above dry, rubbed fabrics treated with the viable amount of commercial product (about 1 gram perfume capsules, heaping cap) versus inventive composition (about 2.5 grams perfume capsules, ½ cap); (e.g., similar to Sample EO). The inventive composition has much greater amounts of perfume in the air with a much smaller product add to the wash.

Current commercial water-soluble polymers present limitations to the use of perfume capsules, as a scent booster delivery system. Perfume capsules are delivered in a water-based slurry, and the slurry is limited to 20-30 wt % maximum of encapsulated perfumes, limiting the total amount of encapsulated perfume to about 1.2 wt %. Use of perfume capsules levels above these levels is limited by the active levels in the perfume capsule slurry that also bring in water that prevents the water-soluble carrier from solidifying, thereby limiting perfume capsule delivery. The result is that consumers generally underdose the desired amount of freshness just due to limitations on what they can add into the wash. The dissolvable solid compositions of the present invention can structure up to more than 15 wt % perfume capsules and yield about 10× freshness delivery, as compared to current water-soluble polymers. Such high delivery is at least partially enabled by the low water content of the present compositions, which allows a user a significant freshness upgrade versus current commercial fabric freshness beads (FIG. 6).

Figure 7A:
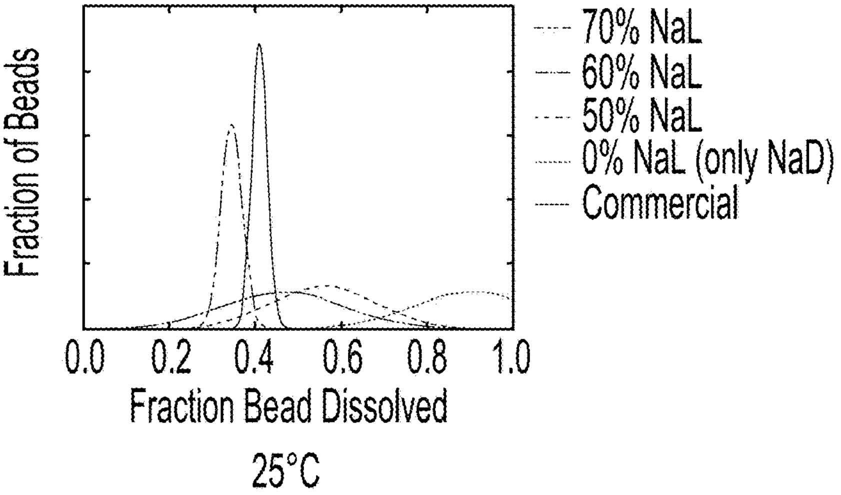
FIGS. 7A, 7B and 7C show dissolution behavior of SDC, prepared with different combinations of crystallizing agents and relative to commercial PEG at 37° C., 25° C. and 5° C. respectively, as determined using the DISSOLUTION TEST METHOD.
Figure 7B:
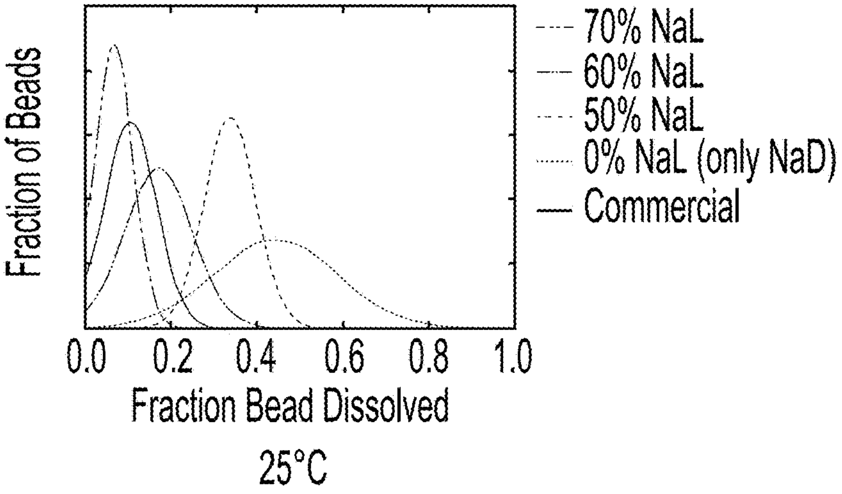
Figure 7C:
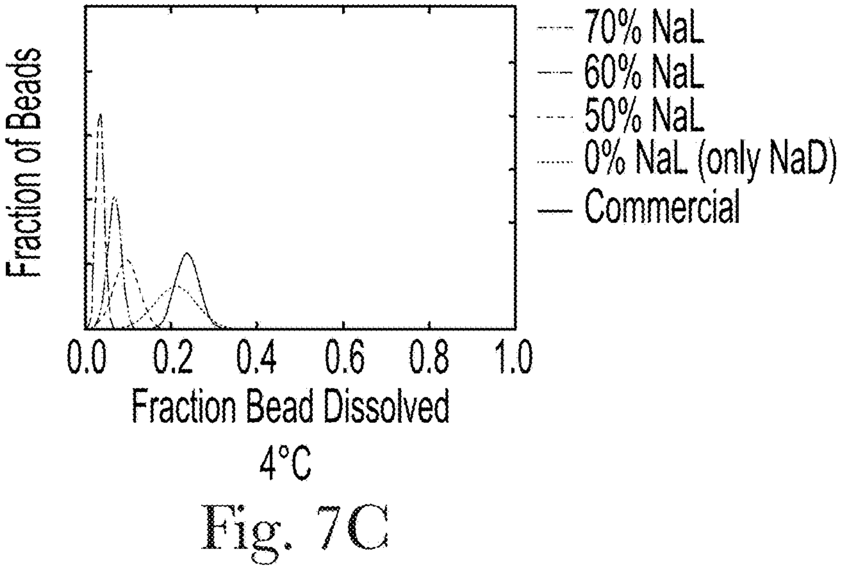

The improved performance of the present inventive compositions as compared to current freshness laundry beads is thought to be linked to the dissolution rate of the compositions' matrix. Without being limited to theory it is believed if the composition dissolves later in the wash cycle, the perfume capsules are more likely to deposit and deposit intact on fabrics through-the-wash (TTW) to enhance freshness performance. Optimization of performance is compounded by the wide variety of wash conditions around the globe. For example, Japan uses cool water 4° C., North America uses 25° C. and Russia use 37° C. Further, North America can use top loading machines with lots of water; much of the world used high efficiency machines much less water, so that absolute dissolution can a problem. Current water-soluble polymers used in commercial fabric freshness beads have limited dissolution rates, set by the limited molecular weight range of the polyethylene glycol (PEG) used as a dissolution matrix. Consequently, one single bead of PEG must function under a range of machine and wash conditions, limiting performance The dissolution rate of the present compositions can be tuned for a range of machine and wash conditions by adjusting the ratio of the composition components (e.g., sodium laurate (NaL): sodium decanoate (NaD) ratio). (FIG. 7A-7C) This allows the opportunity to create a wide range of compositions useful in many differing wash conditions, where various SDCs can release the freshness benefit agents at different times in the wash cycle. FIG. 7A—different time profiles at 37° C., FIG. 7B—different time profiles at 25° C. and FIG. 7C—different profiles at 4° C. relative to commercial PEG-bases beads.

Controlling water migration in mixed bead compositions (e.g., low-water and high-water content beads) is difficult with the current water-soluble polymers used, as water migrates to the surface of high-water content beads. Since the beads are often packaged in an enclosed package that minimizes moisture transmission into and out of the package, trapped moisture on the surface of high-water content beads contacts with the surface of low-water content beads, leading to bead clumping and product dispensing issues. In contrast, the structure of the dissolvable solid compositions prevents water migration out of the SDC, and therefore enables use of materials that are sensitive to water uptake (e.g., cationic polymers, bleaches).

Figure 8:
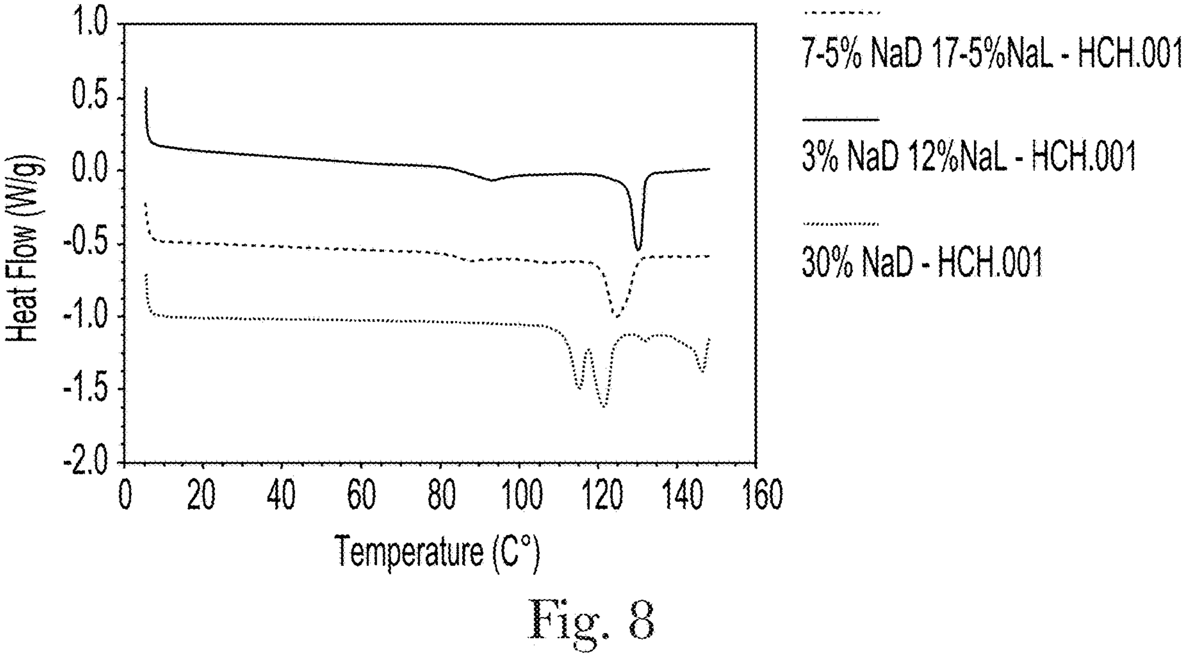
FIG. 8 is a graph showing Measure of the Stability Temperature of the SDC domains for three inventive compositions, using the THERMAL STABILITY TEST METHOD.
Figure 9:
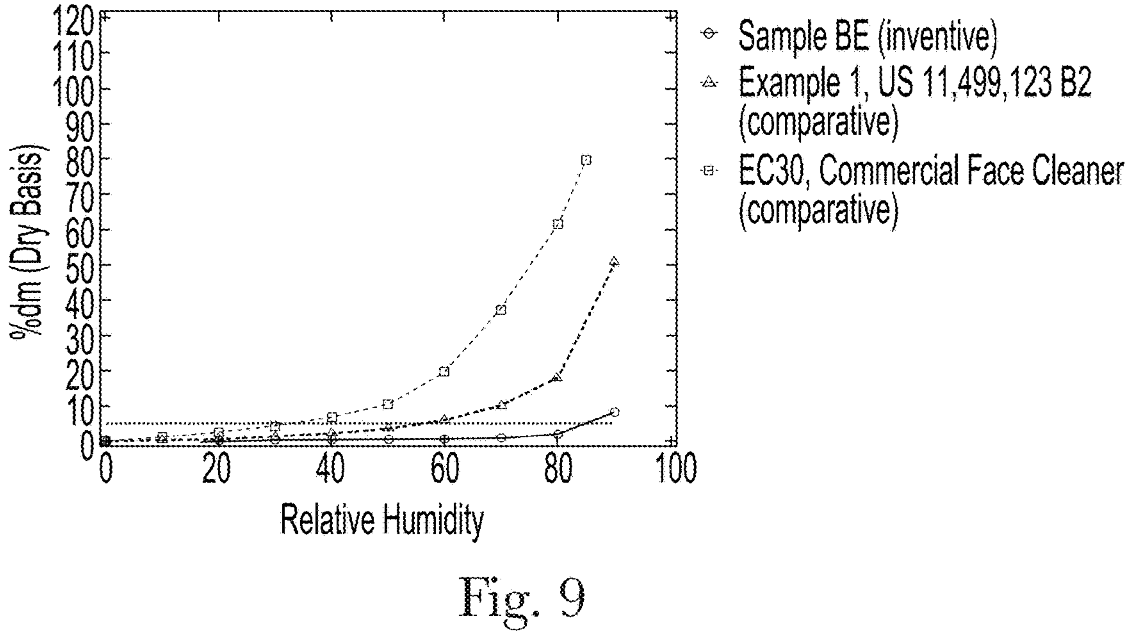
FIG. 9 is a graph showing hydration stability of inventive SDC Domains (% dm<5% at 80% RH), by measuring with the HUMIDITY TEST METHOD the uptake of moisture at 25° C., when exposed to different relative humidities. This is in contrast to comparative examples EC30, Commercial Face Cleaner and Example 1 in U.S. Pat. No. 11,499,123 B2.

As discussed previously current bead formulations that use PEG (and other structuring materials), are susceptible to degradation when exposed to heat and/or humidity during transit. To mitigate against such degradation special shipping conditions and/or packaging are often thus required. The SDC of the present invention comprises a crystalline structure that is stable in a range of temperature and humidity conditions. In preferred embodiments, the SDCs show essentially no melting transitions below 50° C. and in most preferred embodiment, the SDC show essentially no melting transitions below 40° C. as determined by the THERMAL STABILITY TEST METHOD (FIG. 8). Consequently, additional resources for refrigeration during shipping and plastic packaging to prevent moisture transfer are not required. SDCs enable robust protection of the freshness benefit agents. In preferred embodiments, the SDCs show less than 5% dm at 70% RH, more preferred embodiment less than 5% dm at 80% RH and in most preferred embodiment, the SDC show less than 5% dm at 90% RH (FIG. 9) at 25° C., as determined by the HUMIDITY TEST METHOD.

Not wishing to be limited to theory, it is believed that the high dissolution rate of the solid dissolvable composition is provided at least in part by the mesh microstructure. This is believed to be important, as it is this porous structure that provides both 'lightness' to the product, and its ability to dissolve rapidly relative to compressed tablets, which allows ready delivery of actives during use. It is believed to be important that a single crystallizing agent (or in combination with other crystallizing agents) forms fibers in the solid dissolvable composition making process. The formation of fibers allows solid dissolvable compositions that can retain actives without need for compression, which can break microencapsulates.

In embodiments fibrous crystals may have a minimum length of 10 um and thickness of 2 um as determined by the FIBER TEST METHOD.

In embodiments, freshness benefit agents may be in the form of particles which may be: a) evenly dispersed within the mesh microstructure; b) applied onto the surface of the mesh microstructure; or c) some fraction of the particles being dispersed within the mesh microstructure and some fraction of the particles being applied to the surface of the mesh microstructure. In embodiments, freshness benefit agents may be: a) in the form of a soluble film on a top surface of the mesh microstructure; b) in the form of a soluble film on a bottom surface of the mesh microstructure; c) or in the form of a soluble film on both bottom and top surfaces of the mesh. Actives may be present as a combination of soluble films and particles.

Crystallizing Agent

The crystallizing agents are selected from the small group sodium fatty acid carboxylates having saturated chains and with chain lengths ranging from C8-C12. In this compositional range and with the described method of preparation, such sodium fatty acid carboxylates provide a fibrous mesh microstructure, ideal solubilization temperature for making and dissolution in use, and, by suitable blending, the resulting solid dissolvable compositions have tunability in these properties for varied uses and conditions.

Crystallizing agents may be present in Solid Dissolvable Composition Mixtures in an amount of from about between about 5 wt % to about 50 wt %, between about 10 wt % to about 35 wt %, between about 15 wt % to about 35 wt %. Crystallizing agents may be present in the Solid Dissolvable Composition in an amount of from about 50 wt % to about 99 wt %, between about 60 wt % to about 95 wt %, and between about 70 wt % to about 90 wt %.

Suitable crystallizing agents include sodium octanoate (NaC8), sodium decanoate (NaC10), sodium dodecanoate or sodium laurate (NaC12) and combinations thereof.

Aqueous Phase

The aqueous phase present in the Solid Dissolvable Composition Mixtures and the Solid Dissolvable Compositions, is composed of an aqueous carrier of water and optionally other minors including sodium chloride salt. The aqueous phase should contain minimal amounts of salts with other (non-sodium) cations or hydric solvents.

The aqueous phase may be present in the Solid Dissolvable Composition Mixtures in an amount of from about 65 wt % to about 95 wt %, about 65 wt % to about 90 wt %, about 65 wt % to about 85 wt %, by weight of a rheological solid that is formed as an intermediate composition after crystallization of the Solid Dissolvable Composition Mixture.

Sodium chloride in aqueous phase Solid Dissolvable Composition Mixtures may be present between 0 wt % to about 10 wt %, between 0 wt % to about 5 wt %, and between 0 wt % to about 1 wt %. Most preferred embodiments contain less than 2 wt % sodium chloride, to ensure best humidity stability.

Capsule Material

A capsule may include a wall material that encapsulates a benefit agent (benefit agent delivery capsule or just "capsule"). Benefit agent may be referred herein as a "benefit agent" or an "encapsulated benefit agent". The encapsulated benefit agent is encapsulated in the core. The benefit agent may be at least one of: a perfume mixture or a malodor counteractant, or combinations thereof. In one aspect, perfume delivery technology may comprise benefit agent delivery capsules formed by at least partially surrounding a benefit agent with a wall material. The benefit agent may include materials selected from the group consisting of perfume raw materials such as 3-(4-t-butylphenyl)-2-methyl propanal, 3-(4-t-butylphenyl)-propanal, 3-(4-isopropylphenyl)-2-methylpropanal, 3-(3,4-methylenedioxyphenyl)-2-methylpropanal, and 2,6-dimethyl-5-heptenal, alpha-damascone, beta-damascone, gamma-damascone, beta-damascenone, 6,7-dihydro-1,1,2,3,3-pentamethyl-4(5H)-indanone, methyl-7,3-dihydro-2H-1,5-benzodioxepine-3-one, 2-[2-(4-methyl-3-cyclohexenyl-1-yl) propyl] cyclopentan-2-one, 2-sec-butylcyclohexanone, and beta-dihydro ionone, linalool, ethyllinalool, tetrahydrolinalool, and dihydromyrcenol; silicone oils, waxes such as polyethylene waxes; essential oils such as fish oils, jasmine, camphor, lavender; skin coolants such as menthol, methyl lactate; vitamins such as Vitamin A and E; sunscreens; glycerine; catalysts such as manganese catalysts or bleach catalysts; bleach particles such as perborates; silicon dioxide particles; antiperspirant actives; cationic polymers and mixtures thereof. Suitable benefit agents can be obtained from Givaudan Corp. of Mount Olive, New Jersey, USA, International Flavors & Fragrances Corp. of South Brunswick, New Jersey, USA, or Firmenich Company of Geneva, Switzerland or Encapsys Company of Appleton, Wisconsin (USA). As used herein, a "perfume raw material" refers to one or more of the following ingredients: fragrant essential oils; aroma compounds; materials supplied with the fragrant essential oils, aroma compounds, stabilizers, diluents, processing agents, and contaminants; and any material that commonly accompanies fragrant essential oils, aroma compounds.

The wall (or shell) material of the benefit agent delivery capsule may comprise: melamine, polyacrylamide, silicones, silica, polystyrene, polyurea, polyurethanes, polyacrylate based materials, polyacrylate esters based materials, gelatin, styrene malic anhydride, polyamides, aromatic alcohols, polyvinyl alcohol and mixtures thereof. The melamine wall material may comprise melamine crosslinked with formaldehyde, melamine-dimethoxyethanol crosslinked with formaldehyde, and mixtures thereof. The polystyrene wall material may comprise polyestyrene cross-linked with divinylbenzene. The polyurea wall material may comprise urea crosslinked with formaldehyde, urea crosslinked with gluteraldehyde, polyisocyanate reacted with a polyamine, a polyamine reacted with an aldehyde and mixtures thereof. The polyacrylate based wall materials may comprise polyacrylate formed from methylmethacrylate/dimethylaminomethyl methacrylate, polyacrylate formed from amine acrylate and/or methacrylate and strong acid, polyacrylate formed from carboxylic acid acrylate and/or methacrylate monomer and strong base, polyacrylate formed from an amine acrylate and/or methacrylate monomer and a carboxylic acid acrylate and/or carboxylic acid methacrylate monomer, and mixtures thereof.

The composition may comprise from about 0.05% to about 20%, or from about 0.05% to about 10%, or from about 0.1% to about 5%, or from about 0.2% to about 2%, by weight of the composition, of benefit agent delivery capsules. The composition may comprise a sufficient amount of benefit agent delivery capsules to provide from about 0.05% to about 10%, or from about 0.1% to about 5%, or from about 0.1% to about 2%, by weight of the composition, of the encapsulated benefit agent, which may preferably be perfume raw materials, to the composition. When discussing herein the amount or weight percentage of the benefit agent delivery capsules, it is meant the sum of the wall material and the core material.

The benefit agent delivery capsules according to the present disclosure may be characterized by a volume-weighted median particle size from about 1 to about 100 microns, preferably from about 10 to about 100 microns, preferably from about 15 to about 50 microns, more preferably from about 20 to about 40 microns, even more preferably from about 20 to about 30 microns. Different particle sizes are obtainable by controlling droplet size during emulsification.

The benefit agent delivery capsules may be characterized by a ratio of core to shell up to 99:1, or even 99.5:1, on the basis of weight.

The polyacrylate ester-based wall materials may comprise polyacrylate esters formed by alkyl and/or glycidyl esters of acrylic acid and/or methacrylic acid, acrylic acid esters and/or methacrylic acid esters which carry hydroxyl and/or carboxy groups, and allylgluconamide, and mixtures thereof.

The aromatic alcohol-based wall material may comprise aryloxyalkanols, arylalkanols and oligoalkanolarylethers. It may also comprise aromatic compounds with at least one free hydroxyl-group, especially preferred at least two free hydroxy groups that are directly aromatically coupled, wherein it is especially preferred if at least two free hydroxy-groups are coupled directly to an aromatic ring, and more especially preferred, positioned relative to each other in meta position. It is preferred that the aromatic alcohols are selected from phenols, cresols (o-, m-, and p-cresol), naphthols (alpha and beta-naphthol) and thymol, as well as ethylphenols, propylphenols, fluorphenols and methoxyphenols.

The polyurea based wall material may comprise a polyisocyanate.

The shell of the benefit agent delivery capsules may comprise a polymeric material that may be the reaction product of a polyisocyanate and a chitosan. The shell may comprise a polyurea resin, where the polyurea resin comprises the reaction product of a polyisocyanate and chitosan. The benefit agent delivery capsules of the present disclosure may be considered polyurea benefit agent delivery capsules and include a polyurea-chitosan shell. (As used herein, "shell" and "wall" are used interchangeably with regard to the benefit agent delivery capsules, unless indicated otherwise.) The shell may be derived from isocyanates and chitosan.

The delivery particles may be made according to a process that comprises the following steps: forming a water phase comprising chitosan in an aqueous acidic medium; forming an oil phase comprising dissolving together at least one benefit agent and at least one polyisocyanate; forming an emulsion by mixing under high shear agitation the water phase and the oil phase into an excess of the water phase, thereby forming droplets of the oil phase and benefit agent dispersed in the water phase; curing the emulsion by heating, for a time sufficient to form a shell at an interface of the droplets with the water phase, the shell comprising the reaction product of the polyisocyanate and chitosan, and the shell surrounding the core comprising the droplets of the oil phase and benefit agent. Diluents, for example isopropyl myristate, may be used to adjust the hydrophilicity of the oil phase. The oil phase is then added into the water phase and milled at high speed to obtain a targeted size. The emulsion is then cured in one or more heating steps.

The temperature and time are selected to be sufficient to form and cure a shell at the interface of the droplets of the oil phase with the water continuous phase. For example, the emulsion is heated to 85° C. in 60 minutes and then held at 85° C. for 360 minutes to cure the particles. The slurry is then cooled to room temperature.

Chitosan as a percentage by weight of the shell may be from about 21% up to about 95% of the shell. The ratio of the isocyanate monomer, oligomer, or prepolymer to chitosan may be up to 1:10 by weight. The ratio of chitosan in the water phase as compared to the isocyanate in the oil phase may be, based on weight, from 21:79 to 90:10, or even from 1:2 to 10:1, or even from 1:1 to 7:1. The shell may comprise chitosan at a level of 21 wt % or even greater, preferably from about 21 wt % to about 90 wt %, or even from 21 wt % to 85 wt %, or even 21 wt % to 75 wt %, or 21 wt % to 55 wt % of the total shell being chitosan.

The polyisocyanate may be an aliphatic or aromatic monomer, oligomer or prepolymer, usefully comprising two or more isocyanate functional groups. The polyisocyanate may preferably be selected from a group comprising toluene diisocyanate, a trimethylol propane adduct of toluene diisocyanate and a trimethylol propane adduct of xylylene diisocyanate, methylene diphenyl isocyanate, toluene diisocyanate, tetramethylxylidene diisocyanate, naphthalene-1,5-diisocyanate, and phenylene diisocyanate.

The polyisocyanate, for example, can be selected from aromatic toluene diisocyanate and its derivatives used in wall formation for encapsulates, or aliphatic monomer, oligomer or prepolymer, for example, hexamethylene diisocyanate and dimers or trimers thereof, or 3,3,5-trimethyl-5-isocyanatomethyl-1-isocyanato cyclohexane tetramethylene diisocyanate. The polyisocyanate can be selected from 1,3-diisocyanato-2-methylbenzene, hydrogenated MDI, bis(4-isocyanatocyclohexyl)methane, dicyclohexylmethane-4,4'-diisocyanate, and oligomers and prepolymers thereof. This listing is illustrative and not intended to be limiting of the polyisocyanates useful in the present disclosure.

The polyisocyanates useful in the invention comprise isocyanate monomers, oligomers or prepolymers, or dimers or trimers thereof, having at least two isocyanate groups. Optimal crosslinking can be achieved with polyisocyanates having at least three functional groups.

Polyisocyanates, for purposes of the present disclosure, are understood as encompassing any polyisocyanate having at least two isocyanate groups and comprising an aliphatic or aromatic moiety in the monomer, oligomer, or prepolymer. If aromatic, the aromatic moiety can comprise a phenyl, a toluyl, a xylyl, a naphthyl or a diphenyl moiety, more preferably a toluyl or a xylyl moiety. Aromatic polyisocyanates, for purposes herein, can include diisocyanate derivatives such as biurets and polyisocyanurates. The polyisocyanate, when aromatic, can be, but is not limited to, methylene diphenyl isocyanate, toluene diisocyanate, tetramethylxylidene diisocyanate, polyisocyanurate of toluene diisocyanate (commercially available from Bayer under the tradename Desmodur® RC), trimethylol propane-adduct of toluene diisocyanate (commercially available from Bayer under the tradename Desmodur® L75), or trimethylol propane-adduct of xylylene diisocyanate (commercially available from Mitsui Chemicals under the tradename Takenate® D-110N), naphthalene-1,5-diisocyanate, and phenylene 5 diisocyanate.

There is a preference for aromatic polyisocyanate; however, aliphatic polyisocyanates and blends thereof may be useful. Aliphatic polyisocyanate is understood as a polyisocyanate which does not comprise any aromatic moiety. Aliphatic polyisocyanates include a trimer of hexamethylene diisocyanate, a trimer of isophorone diisocyanate, a trimethylol propane-adduct of hexamethylene diisocyanate (available from Mitsui Chemicals) or a biuret of hexamethylene diisocyanate (commercially available from Bayer under the tradename Desmodur® N 100).

The shell may degrade at least 50% after 20 days (or less) when tested according to test method OECD 301B. The shell may preferably degrade at least 60% of its mass after 60 days (or less) when tested according to test method OECD 301B. The shell may degrade from 30-100%, preferably 40-100%, 50-100%, 60-100%, or 60-95%, in 60 days, preferably 50 days, more preferably 40 days, more preferably 28 days, more preferably 14 days.

The polyvinyl alcohol-based wall material may comprise a crosslinked, hydrophobically modified polyvinyl alcohol, which comprises a crosslinking agent comprising i) a first dextran aldehyde having a molecular weight of from 2,000 to 50,000 Da; and ii) a second dextran aldehyde having a molecular weight of from greater than 50,000 to 2,000,000 Da.

The core of the benefit agent delivery capsules of the present disclosure may comprise a partitioning modifier, which may facilitate more robust shell formation. The partitioning modifier may be combined with the core's perfume oil material prior to incorporation of the wall-forming monomers. The partitioning modifier may be present in the core at a level of from about 5% to about 55%, preferably from about 10% to about 50%, more preferably from about 25% to about 50%, by weight of the core.

The partitioning modifier may comprise a material selected from the group consisting of vegetable oil, modified vegetable oil, mono-, di-, and tri-esters of C4-C24 fatty acids, isopropyl myristate, dodecanophenone, lauryl laurate, methyl behenate, methyl laurate, methyl palmitate, methyl stearate, and mixtures thereof. The partitioning modifier may preferably comprise or even consist of isopropyl myristate. The modified vegetable oil may be esterified and/or brominated. The modified vegetable oil may preferably comprise castor oil and/or soy bean oil. US Patent Application Publication 20110268802, incorporated herein by reference, describes other partitioning modifiers that may be useful in the presently described benefit agent delivery capsules.

The perfume delivery capsule may be coated with a deposition aid, a cationic polymer, a non-ionic polymer, an anionic polymer, or mixtures thereof. Suitable polymers may be selected from the group consisting of: polyvinylformaldehyde, partially hydroxylated polyvinylformaldehyde, polyvinylamine, polyethyleneimine, ethoxylated polyethyleneimine, polyvinylalcohol, polyacrylates, and combinations thereof. The freshening composition may include one or more types of benefit agent delivery capsules, for examples two benefit agent delivery capsule types, wherein one of the first or second benefit agent delivery capsules (a) has a wall made of a different wall material than the other; (b) has a wall that includes a different amount of wall material or monomer than the other; or (c) contains a different amount perfume oil ingredient than the other; (d) contains a different perfume oil; (e) has a wall that is cured at a different temperature; (f) contains a perfume oil having a different cLogP value; (g) contains a perfume oil having a different volatility; (h) contains a perfume oil having a different boiling point; (i) has a wall made with a different weight ratio of wall materials; (j) has a wall that is cured for different cure time; and (k) has a wall that is heated at a different rate.

Preferably, the perfume delivery capsule has a wall material comprising a polymer of acrylic acid or derivatives thereof and a benefit agent comprising a perfume mixture.

More preferably, the perfume delivery capsule has a wall material comprising silica and a benefit agent comprising a perfume mixture such as the delivery capsules disclosed in US 2020/0330949 A1.

Most preferably, the perfume delivery capsule has a wall material comprising chitosan cross-linked with a polyisocyanate as disclosed in US 2021/0339217 A1.

Neat Perfume Materials

The solid dissolvable composition may include unencapsulated perfume comprising one or more perfume raw materials that solely provide a hedonic benefit (i.e., that do not neutralize malodors yet provide a pleasant fragrance). Suitable perfumes are disclosed in U.S. Pat. No. 6,248,135. For example, the solid dissolvable composition may include a mixture of volatile aldehydes for neutralizing a malodor and hedonic perfume aldehydes.

Where perfumes, other than the volatile aldehydes in the malodor control component, are formulated into the solid dissolvable composition.

Solid-Dissolvable Composition

Consumer product comprising a plurality of particles used to refresh laundry, comprising a solid dissolvable composition having one or more benefit agents (e.g., perfume capsule, neat perfume) dispersed throughout the particles. In one embodiment, the freshness benefit agent is perfume capsule; in another embodiment, the freshness benefit agent is neat perfume; in another embodiment, the freshness benefit agent is neat perfume in the form of dispersed drops; in another embodiment, the freshness benefit agent is neat perfume distributed throughout a fibrous microstructure; in another embodiment, one freshness benefit agent is perfume capsule, and a second freshness benefit agent is a neat perfume.

In embodiments, the consumer product comprises SDC is in the solid form of beads, that are all the same solid dissolvable composition; in another embodiment, the solid form in the consumer product are of one or more solid dissolvable compositions (e.g., some solid dissolvable compositions with PMC and some solid dissolvable compositions with perfume). The solid form of the SDC may be a powder, a particle, an agglomerate, a flake, a granule, a pellet, a tablet, a lozenge, a puck, a briquette, a brick, a solid block, a unit, dose, or other solid form known to those of skill in the art.

In one embodiment, SDC contain less than about 13 wt %; in another embodiment, SDC contain less than about 10 wt % and 1 wt % neat perfume; in another embodiment SDC contain less than about 8 wt % and 2 wt % neat perfume.

In one embodiment, SDC contain less than about 18 wt % perfume capsules; in another embodiment SDC contain between about 0.01 wt % to about 15 wt % perfume capsules, preferably between about 0.1 wt % to about 15% wt % perfume capsules, more preferably between about 1 wt % to about 15 wt % perfume capsules, most preferably between about 5 wt % to about 15 wt % perfume capsules, based on the total weight of the solid dissolvable composition.

The aqueous phase may be present in the Solid Dissolvable Composition in an amount of 0 wt % to about 10 wt %, 0 wt % to about 9 wt %, 0 wt % to about 8 wt %, about 5 wt %, by weight of the intermediate rheological solid.

In one embodiment, the consumer product is added directly into the wash drum, at the start of the wash; in another embodiment, the consumer product is added to the fabric enhancer cup in the washer; in another embodiment, the consumer product is added at the start of the wash; in another embodiment, the consumer product is added during the wash.

In one embodiment, the consumer product is sold in paper packaging, in one embodiment, the consumer product is sold in unit dose packaging; in one embodiment, the consumer product is sold with different colored particles; in one embodiment, the consumer product is sold in a sachet; in one embodiment, the consumer product is sold with different colored particles; in one embodiment, the consumer product is sold in a recyclable container.

Dissolution Test Method

All samples and procedures are maintained at room temperature (25±3° C.) prior to testing, and are placed in a dessicant chamber (0% RH) for 24 hours, or until they come to a constant weight.

All dissolution measurements are done at a controlled temperature and a constant stir rate. A 600-mL jacketed beaker (Cole-Palmer, item #UX-03773-30, or equivalent) is attached and cooled to temperature by circulation of water through the jacketed beaker using a water circulator set to a desired temperature (Fisherbrand Isotemp 4100, or equivalent). The jacketed beaker is centered on the stirring element of a VWR Multi-Position Stirrer (VWR North American, West Chester, Pa., U.S.A. Cat. No. 12621-046). 100 mL of deionized water (MODEL 18 MΩ, or equivalent) and stirring bar (VWR, Spinbar, Cat. No. 58947-106, or equivalent) is added to a second 150-mL beaker (VWR North American, West Chester, Pa., U.S.A. Cat. No. 58948-138, or equivalent). The second beaker is placed into the jacketed beaker. Enough Millipore water is added to the jacketed beaker to be above the level of the water in the second beaker, with great care so that the water in the jacket beaker does not mix with the water in the second beaker. The speed of the stir bar is set to 200 RPM, enough to create a gentle vortex. The temperature is set in the second beaker using the flow from the water circulator to reach 25° C. or 37° C., with relevant temperature reported in the examples. The temperature in the second beaker is measured with a thermometer before doing a dissolution experiment.

All samples were sealed in a desiccator prepared with fresh desiccant (VWR, Desiccant-Anhydrous Indicating Drierite, stock no. 23001, or equivalent) until reaching a constant weight. All tested samples have a mass less than 15 mg.

A single dissolution experiment is done by removing a single sample from the desiccator. The sample is weighed within one minute after removing it from the desiccator to measure an initial mass ($M_I$). The sample is dropped into the second beaker with stirring. The sample is allowed to dissolve for 1 minute. At the end of the minute, the sample is carefully removed from the deionized water. The sample is placed again in the desiccator until reaching a constant final mass ($M_F$). The percentage of mass loss for the sample in the single experiment is calculated as $M_L=100*(M_I-M_F)/M_I$.

Nine additional dissolution experiments are done, by first replacing the 100 ml of water with a new charge of deionized water, adding a new sample from the desiccator for each experiment and repeating the dissolution experiment described in the previous paragraph.

The average percent of mass loss ($M_A$) for the Test is calculated as the average percent of mass loss for the ten experiments and the average standard deviation of mass loss ($SD_A$) is the standard deviation of the mean percent of mass loss for the ten experiments.

The method returns three values: 1) the average mass of the sample ($M_S$), 2) the temperature at which the samples are dissolved (T), and 3) the average percent of mass loss ($M_A$). The method returns 'NM' for all values if the method was not performed on the sample. The average percent of mass loss ($M_A$) and the average standard deviation of the mean percent of mass loss ($SD_A$) are used to draw the dissolutions curves shared in FIG. 7 and FIG. 10.

Humidity Test Method

All samples and procedures are maintained at room temperature (25±3° C.) prior to testing.

The Humidity Test Method is used to determine the amount of water vapor sorption that occurs in a raw material or composition between being dried down at 0% RH and various RH at 25° C. In this method, 10 to 60 mg of sample are weighed, and the mass change associated with being conditioned with differing environmental states is captured in a dynamic vapor sorption instrument. The resulting mass gain is expressed as % change in mass per dried sample mass recorded at 0% RH.

This method makes use of a SPSx Vapor Sorption Analyzer with 1 ug resolution (ProUmid GmbH & Co. KG, Ulm, Germany), or equivalent dynamic vapor sorption (DVS) instrument capable of controlling percent relative humidity (% RH) to within ±3%, temperature to within ±2° C., and measuring mass to a precision of ±0.001 mg.

A 10-60 mg specimen of raw material or composition is dispersed evenly into a tared 1" diameter Al pan. The Al pan on which raw material or composition specimen has been dispersed is placed in the DVS instrument with the DVS instrument set to 25° C. and 0% RH at which point masses are recorded ~every 15 minutes to a precision of 0.001 mg or better. After the specimen is in the DVS for a minimum of 12 hours at this environmental setting and constant weight has been achieved, the mass $m_d$ of the specimen is recorded to a precision of 0.01 mg or better. Upon completion of this step, the instrument is advanced in 10% RH increments up to 90% RH. The specimen is held in the DVS at each step for a minimum of 12 hours and until constant weight has been achieved, the mass $m_n$ of the specimen is recorded to a precision of 0.001 mg or better at each step.

For a particular specimen, constant weight can be defined as change in mass consecutive weighing that does not differ by more than 0.004%. For a particular specimen, % Change in mass per dried sample mass (% dm) is defined as $$\%\text{ Change in mass per dried sample mass} = \frac{m_n - m_d}{m_d} \times 100\%$$

The % Change in mass per dried sample mass is reported in units of % to the nearest 0.01%

Thermal Stability Test Method

All samples and procedures are maintained at room temperature (25±3° C.) prior to testing, and at a relative humidity of 40±10% for 24 hours prior to testing.

In the Thermal Stability Test Method, differential scanning calorimetry (DSC) is performed on a 20 mg±10 mg specimen of sample composition. A simple scan is performed between 25° C. and 90° C., and the temperature at which the largest peak is observed to occur is reported as the Stability Temperature to the nearest ° C.

The sample is loaded into a DSC pan. All measurements are done in a high-volume-stainless-steel pan set (TA part #900825.902). The pan, lid and gasket are weighed and tared on a Mettler Toledo MT5 analytical microbalance (or equivalent; Mettler Toledo, LLC., Columbus, OH). The sample is loaded into the pan with a target weight of 20 mg (+/−10 mg) in accordance with manufacturer's specifications, taking care to ensure that the sample is in contact with the bottom of the pan. The pan is then sealed with a TA High Volume Die Set (TA part #901608.905). The final assembly is measured to obtain the sample weight. The sample is loaded into TA Q Series DSC (TA Instruments, New Castle, DE) in accordance with the manufacture instructions. The DSC procedure uses the following settings: 1) equilibrate at 25° C.; 2) mark end of cycle 1; 3) ramp 1.00° C./min to 90.00° C.; 4) mark end of cycle 3; then 5) end of method; Hit run.

Moisture Test Method

All samples and procedures are maintained at room temperature (25±3° C.) prior to testing, and at a relative humidity of 40±10% for 24 hours prior to testing.

The Moisture Test Method is used to quantify the weight percent of water in a composition. In this method, a Karl Fischer (KF) titration is performed on each of three like specimens of a sample composition. Titration is done using a volumetric KF titration apparatus and using a one-component solvent system. Specimens are 0.3±0.05 g in mass and are allowed to dissolve in the titration vessel for 2.5 minutes prior to titration. The average (arithmetic mean) moisture content of the three specimen replicates is reported to the nearest 0.1 wt. % of the sample composition.

Sample composition is conditioned at at 25±3° C. and at 40±10.0% RH for at least 24 hours prior to measurement. One suitable example of an apparatus and specific procedure is as follows.

To measure the moisture content of the sample, measurements are made using a Mettler Toledo V30S Volumetric KF Titrator. The instrument uses Honeywell Fluka Hydranal Solvent (cat. #34800-1L-US) to dissolve the sample, Honeywell Fluka Hydranal Titrant-5 (cat. #34801-1L-US) to titrate the sample and is equipped with three drying tubes (Titrant Bottle, Solvent Bottle, and Waste Bottle) packed with Honeywell Fluka Hydranal Molecular sieve 3 nm (cat. #34241-250g) to preserve the efficacy of the anhydrous materials.

The method used to measure the sample is Type "KF vol", ID "U8000", and Title "KFVol 2-comp 5", and has eight lines which are each method functions.

The Line 1, Title has the following things selected: the Type is set to Karl Fischer titration Vol.; Compatible with is set to be V10S/V20S/V30S/T5/ T7/ T9; ID is set as U8000; Title is set as KFVol 2-comp 5; Author is set as Administrator; the Date/Time along with the Modified on and Modified by were defined by when the method was created; Protect is set to no; and SOP is set to None.

The Line 2, Sample has two options, Sample and Concentration. When the Sample option is chosen, the following fields are defined as: Number of IDs is set as 1; ID 1 is set as . . . ; Entry type is selected to be Weight; Lower limit is set as 0.0 g; the Upper limit is set as 5.0 g; Density is set as 1.0 g/mL; Correction factor is set as 1.0; Temperature is set to 25.0° C.; Autostart is selected; and Entry is set to After addition. When the Concentration option is chosen, the following fields are defined as: Titrant is selected as KF 2-comp 5; Nominal conc. is set as 5 mg/mL; Standard is selected to be Water-Standard 10.0; Entry type is selected to be Weight; Lower limit is set as 0.0 g; Upper limit is set as 2.0 g; Temperature is set as 25.0° C.; Mix time is set as 10 s; Autostart is selected; Entry is selected to be After addition; Conc. lower limit is set to be 4.5 mg/mL; and Conc. upper limit is set to be 5.6 mg/mL.

The Line 3, Titration stand (KF stand) has the following fields defined as: Type is set to KF stand; Titration stand is selected to be KF stand; Source for drift is selected to be Online; Max. start drift is set to be 25.0 μg/min.

The Line 4, Mix time has the following fields defined as: Duration is set to be 150 s.

The Line 5, Titration (KF Vol) [1] has six options, Titrant, Sensor, Stir, Predispense, Control, and Termination. When the Titrant option is chosen, the following fields are defined as: Titrant is selected to be KF 2-comp 5; Nominal conc. is set to be 5 mg/mL; and Reagent type is set as 2-comp. When the Sensor option is chosen, the following fields are defined as: Type is set to Polarized; Sensor is selected as DM143-SC; Unit is set as mV; Indication is set as Voltametric; and Ipol is set as 24.0 μA. When the Stir option is chosen, the following fields are defined as: Speed is set as 50%. When the Pre-dispense option is chosen, the following fields are defined as: Mode is selected to be None; Wait time is set to be 0 s. When the Control option is chosen, the following fields are defined as: End Point is set to 100.00 mV; Control band is set to be 400.00 mV; Dosing rate (max) is set to be 3 mL/min; Dosing rate (min) is set to be 100 μL/min; and Start is selected to be Normal. When the Termination option is chosen, the following fields are defined as: Type is selected as Drift stop relative; Drift is set to 15.0 μg/min; At Vmax 15 mL; Min. time is set as 0 s; and Max. time is set as ∞ s.

The Line 6, Calculation has the following fields defined as: Result type is selected to be Predefined; Result is set as Content; Result unit is set as %; Formula is set as R1=(VEQ*CONC−TIME*D . . . ); Constant C=is set as 0.1; Decimal places is set as 2; Result limits is not selected; Record statistics is selected; Extra statistical functions is not selected.

The Line 7, Record has the following fields defined as: Summary is selected to be Per sample; Results is selected to be No; Raw results is selected to be No; TABLE of meas. values is selected to be No; Sample data is selected to be No; Resource data is selected to be No; E-V is selected to be No; E-t is selected to be No; V-t is selected to be No; H2O-t is selected to be No; Drift-t is selected to be No; H2O-t & Drift-t is selected to be no; V-t & Drift-t is selected to be No; Method is selected to be No; and Series data is selected to be No.

The Line 8, End of Sample has the following fields defined as: Open series is selected. Once the method is selected, press Start, the following fields are defined as: Type is set as Method; Method ID is set as U8000; Number of samples is set as 1; ID 1 is set as . . . ; and Sample size is set as 0 g. The Start option is the pressed again. The instrument will measure the Max Drift, and once it reaches a steady state will allow the user to select Add sample, at which point the user will add the Three-hole adapter and stoppers are removed, the sample is loaded into the Titration beaker, the Three-hole adapter and stoppers are replaced, and the mass, g, of the sample is entered into the Touch-screen. The reported value will be the weight percent of water in the sample. This measure is repeated in triplicate for each sample, and the average of the three measures is reported.

Fibers Test Method

Figure 13A:
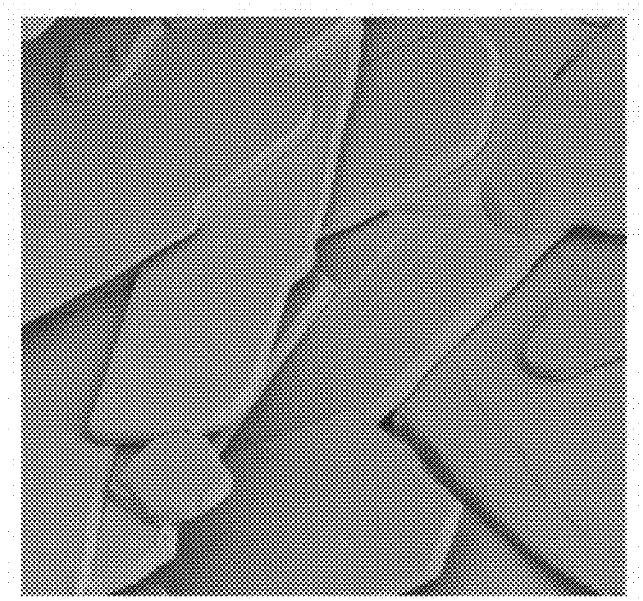
FIG. 13A shows a representative Scanning Electron Micrograph (SEM) of a comparative composition prepared from potassium palmitate (KC16), showing platelet crystals.
Figure 13B:
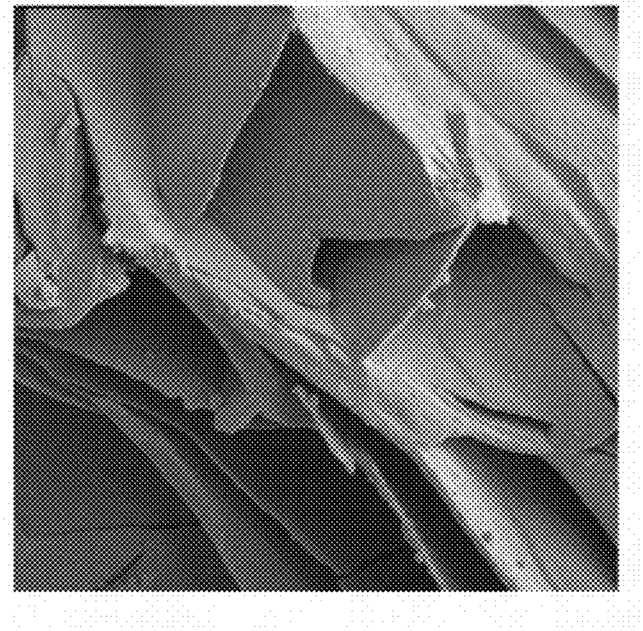
FIG. 13B shows a representative Scanning Electron Micrograph (SEM) of a comparative composition prepared from triethanolamine palmitate (TEA C16), showing platelet crystals.

The Fiber Test Method is used to determine whether a solid dissolved composition crystallizes under process conditions and contains fiber crystals. A simple definition of a fiber is "a thread or a structure or an object resembling a thread". Fibers have a long length in just one direction (e.g., FIG. 2A and FIG. 2B). This differs from other crystal morphologies such as plates or platelets—with a long length in two or more directions (e.g., FIG. 13A and FIG. 13B). Only solid dissolved compositions with fibers are in scope of this invention.

A sample measuring about 4 mm in diameter is mounted on an SEM specimen shuttle and stub (Quorum Technologies, AL200077B and E7406) with a slit precoated comprising a 1:1 mixture of Scigen Tissue Plus optimal cutting temperature (OCT) compound (Scigen 4586) compound and colloidal graphite (agar scientific G303E). The mounted sample is plunge-frozen in a liquid nitrogen-slush bath. Next, the frozen sample is inserted to a Quorum PP3010Tcryo-prep chamber (Quorum Technologies PP3010T), or equivalent and allowed to equilibrate to −120° C. prior to freeze-fracturing. Freeze fracturing is performed by using a cold built-in knife in the cryo-prep chamber to break off the top of the vitreous sample. Additional sublimation is performed at −90° C. for 5 mins to eliminate residual ice on the surface of the sample. The sample is cooled further to −150° C. and sputter-coated with a layer of Pt residing in the cryo-prep chamber for 60 s to mitigate charging.

High resolution imaging is performed in a Hitachi Ethos NX5000 FIB-SEM (Hitachi NX5000), or equivalent.

To determine the fiber morphology of a sample, imaging is done at 20,000× magnification. At this magnification, individual crystals of the crystallizing agent may be observed. The magnification may be slightly adjusted to lower or higher values until individual crystals are observed. One skilled in the art can assess the longest dimension of the representative crystals in the image. If this longest dimension is about 10× or greater than the other orthogonal dimensions of the crystals, these crystals are considered fibers and in scope for the invention.

EXAMPLES

The invention is a solid dissolvable composition (SDC) comprising a mesh microstructure formed from dry sodium fatty acid carboxylate formulations containing high levels of active agent, such as freshness benefit agents, which dissolve during normal use to deliver extraordinary freshness to fabrics.

The EXAMPLES show inventive compositions that they can load high levels of freshness benefit agents including perfume capsules and neat perfumes, often more than currently marketed products.

In summary, EXAMPLE 1 shows inventive compositions with different levels of perfume capsules, EXAMPLE_2 shows inventive compositions with different levels of perfume, EXAMPLE 3 shows inventive compositions with different combinations of crystallizing agents, EXAMPLE 4 shows comparative compositions with long chain length crystallizing agents, EXAMPLE 5 shows inventive compositions with blends of perfume capsules and neat perfumes and EXAMPLE 6 shows inventive compositions that use sodium chloride as a process aid for crystallization in the Forming Stage of the process. EXAMPLE 7 shows inventive compositions prepared at pilot plant scale that enable higher levels of crystallizing agent in the forming process, where the crystallizing agent is sourced as fatty acid and neutralized during making. Finally, EXAMPLE 8 shows inventive compositions with perfume capsule with different capsule chemistries.

All EXAMPLES are prepared in three making steps:

1. Mixing—in which crystallizing agents are completely solubilized in water.

2. Forming—in which the composition from the mixing step is shaped by size and dimensions of the desired SDC through techniques including crystallization, partial-drying, salt addition or viscosity build.
3. Drying—in which amount of water is reduced to ensure the desired performance including dissolution, hydration, and thermal stability.

Active agents are generally added to the SDC during the Mixing step or after the Drying step.

The data in TABLE 1-TABLE 16, provide examples of the composition and performance parameters for inventive and comparative SDC.

SDCM—top section, provides all the amounts of materials used to create the Solid Dissolvable Composition Mixture (SDCM) in Mixing. Other entries are calculated: '% CA' is the weight percentage of all crystallizing agents in the SDCM.

SDC—middle section, provides weights corresponding to the amounts in the final Solid Dissolvable Composition (SDC) with all non-bounded water removed. Other entries are calculated: '% CA' is the percentage of all crystallizing agents in the SDC; '% Slow CA' is the percentage of the slower-dissolving crystallizing agent (i.e., longer chain length), if the sample contains a mixture of crystallizing agents; 'Perfume capsules' is the percentage of perfume capsules in the SDC, after the Drying; 'Perfume' is the percentage of neat perfume in the SDC, after Drying; 'AA' is the total amount of perfume capsules and neat perfume, when both are present.

Dissolution Performance—bottom section, where 'Ms', 'T' and '$M_A$' are outputs of the DISSOLUTION TEST METHOD. A value of 'NM' means the performance was not measured.

Materials (1) Water: Millipore, Burlington, MA (18 m-ohm resistance)
(2) Sodium caprylic (sodium octanoate, NaC8): TCI Chemicals, Cat #00034
(3) Sodium caprate (sodium decanoate, NaC10): TCI Chemicals, Cat #D0024
(4) Sodium laurate (sodium dodecanoate, NaC12): TCI Chemicals, Cat #L0016
(5) Sodium myristate (sodium tetradecanoate, NaC14): TCI Chemicals, Cat. #M0483
(6) Sodium palmitate (sodium hexadecanoate, NaC16): TCI Chemicals, Cat. #P00007
(7) Sodium stearate (sodium octadecanoate, NaC18): TCI Chemicals, Cat. #S0031
(8) Perfume capsule slurry: Encapsys, Encapsulated Perfume #1 melamine formaldehyde wall chemistry, (31% activity)
(9) Neat perfume: International Flavors and Fragrances, Neat Perfume, Cat #FC CLP 20
(10) Sodium chloride: VWR BDH Chemical, Cat. no. BDH9286-500 g
(11) Fatty Acid Blend: C810L, Procter & Gamble Chemicals, Sample Code: SR26399
(12) Lauric Acid: Peter Cremer, Cat. #FA-1299 Lauric Acid
(13) Sodium Hydroxide (50 wt. % solution): Fisher Scientific, Cat. #SS254-4
(14) Perfume Capsule Slurry: Encapsys, Encapsulated Perfume #2, polyacrylate wall chemistry, 21 wt. % active
(15) Perfume Capsule Slurry: Encapsys, Encapsulated Perfume #3, polyacrylate wall chemistry with high perfume core to wall ratio, 21 wt. % active
(16) Perfume Capsule Slurry: Encapsys, Encapsulated Perfume #4 with polyurea wall chemistry, 32 wt. % active
(17) Perfume Capsule Slurry: Encapsulated Perfume #5, silica based wall chemistry, 6.2 wt. % active Example 1

EXAMPLE 1 shows inventive compositions with different levels of perfume capsules, with all the perfume capsules added during Mixing. Such combinations offer consumers extraordinary dry fabric freshness.

Figure 10:
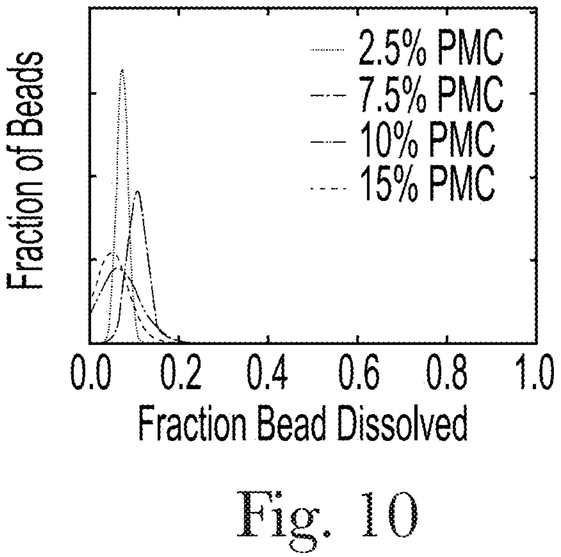
FIG. 10 is a graph showing dissolution profiles at 25° Cas determined by the DISSOLUTION TEST METHOD, as a function of perfume capsule wt. %, for four invention compositions (Sample AA, Sample AB, Sample AC, and Sample AD), showing the dissolution properties are primarily a function of the blend of crystallizing agent and largely independent of the amount of perfume capsules.
Figure 11:
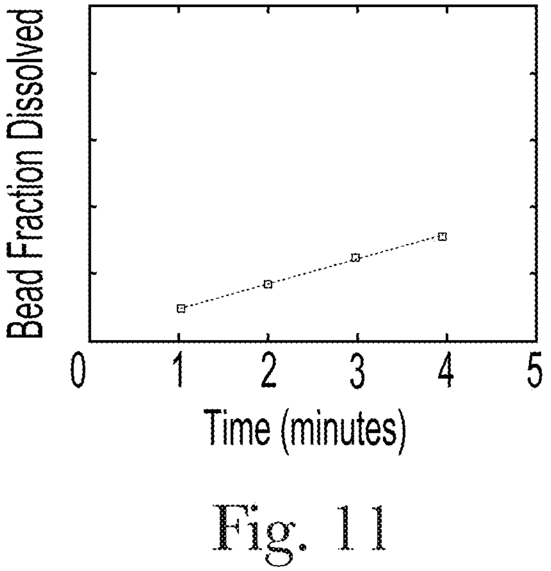
FIG. 11 is a graph showing average percentage of mass loss as determined by the DISSOLUTION TEST METHOD for Sample AC, when allowed to dissolve for 1 min., 2 min., 3 min. and 4 min. respectively. The linearity of the average percent of mass loss, allows extrapolation to complete average mass loss to about 13 minutes.
Figure 12:
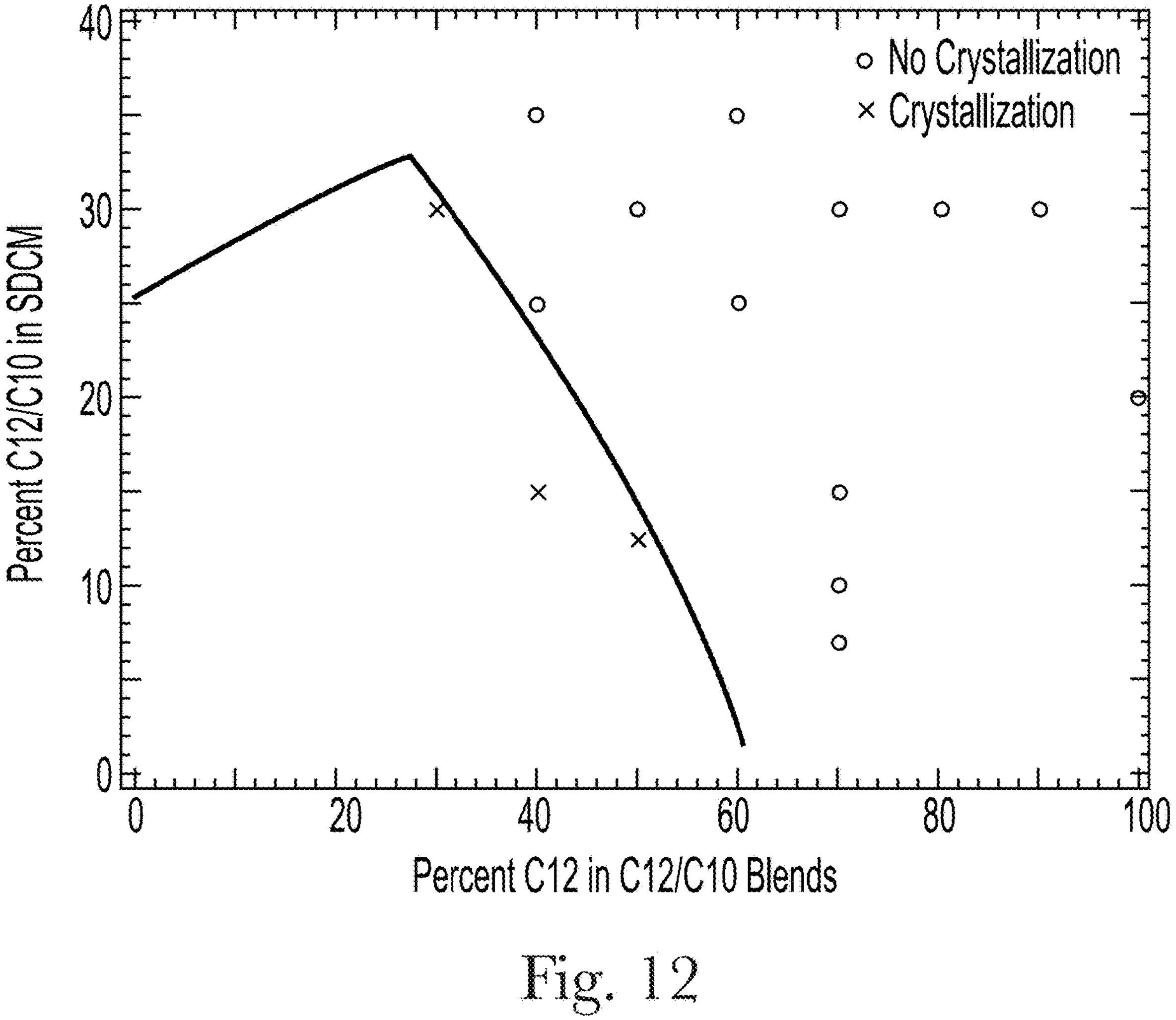
FIG. 12 is a graph showing the effect of composition of the SDCM on the potential for crystallization in the Forming Stage, with mixtures of C12/ C10 crystallizing agents.

Samples AA-AL show inventive compositions that form fiber mesh microstructure with two combinations of sodium fatty acid carboxylate crystallizing agents. Sample AA-Sample AD (TABLE 1) were prepared with a ratio of 70:30 NaL:NaD containing more slow-dissolving crystallizing agent in the composition and more suitable for warmer temperature washes and/or releasing perfume capsules later in the wash cycle. They contain 25 wt. % crystallizing agent in the SDCM between 85.0-97.25 wt. % in the final SDC composition. Sample AE-Sample AL (TABLE 2, TABLE 3) were prepared with a ratio of 60:40 NaL:NaD containing less slow-dissolving crystallizing agent in the composition and more suitable for warm temperature washes or releasing perfume capsules earlier in the wash cycle than those in TABLE 1 (FIG. 7). They contain 25 wt. % crystallizing agent in the SDCM and between 82.5-98.9 wt. % in the final SDC composition. Finally, the data from TABLE 2 and TABLE 3, show that the dissolution is set by essentially by the composition of crystallizing agents, and not by the amount of perfume capsules in the composition (FIG. 10).

Preparation of the Solid Dissolvable Composition

The Compositions were prepared in the following fashion.

(Mixing) A 250-ml stainless steel beaker (Thermo Fischer Scientific, Waltham, MA.) was placed on a hot plate (VWR, Radnor, PA, 7×7 CER Hotplate, cat. no. NO97042-690). Water (Milli-Q Academic) and crystallizing agents were added to the beaker. A temperature probe was placed into composition. A mixing device comprising an overhead mixer (IKA Works Inc, Wilmington, NC, model RW20 DMZ) and a three-blade impeller design was assembled, with the impeller placed into the composition. The heater was set at 80° C., the impeller was set to rotate at 250 rpm and the composition was heated to 80° C. until all the crystallizing agent was solubilized and the composition was clear. The composition was then poured into a Max 100 Mid Cup, capped, and allowed to cool to 25° C. Perfume capsules were added to the cooled solution and homogenized into the composition using a Speedmixer (Flack Tek. Inc, Landrum, SC, model DAC 150.1 FVZ-K) at a rate of 3000 rpm for 3 minutes. The composition was transferred to polymer mold containing a pattern of 5 mm diameter hemispheres, evenly dispersed using a rubber baking spatula, and excess materials was scraped from the top of the mold.

(Forming) The mold was placed in a refrigerator (VWR Door Solid Lock F Refrigerator 115V, 76300-508, or equivalent) equilibrated to 4° C. for 24 hours allowing the crystallizing agent to crystallize.

(Drying) If the preparation crystallizes, the molds were placed in a convection oven (Yamato, DKN400, or equivalent) set to 25° C. with air circulating for another 24 hours. The beads were then removed from the mold and collected. The beads were less than 5 wt. % water, as measured by MOISTURE TEST METHOD.

TABLE 1

| | Sample AA (inventive) | Sample AB (inventive) | Sample AC (inventive) | Sample AD (inventive) |
|---|---|---|---|---|
| | | SDCM | | |
| 1) Water | 36.555 g | 34.236 g | 33.004 g | 30.375 g |
| 2) NaC8 | — | — | — | — |
| 3) NaC10 | 3.753 g | 3.753 g | 3.751 g | 3.750 g |
| 4) NaC12 | 8.758 g | 8.759 g | 8.755 g | 8.753 g |
| 5) NaC14 | — | — | — | — |
| 6) NaC16 | — | — | — | — |
| 7) NaC18 | — | — | — | — |
| % CA | 25.0 wt. % | 25.0 wt. % | 25.0 wt. % | 25.0 wt. % |
| 8) Perfume capsule slurry | 1.070 g | 3.280 g | 4.536 g | 7.132 g |
| | | SDC | | |
| NaC8 | — | — | — | — |
| NaC10 | 29.2 wt. % | 27.7 wt. % | 27.0 wt. % | 25.5 wt. % |
| NaC12 | 68.2 wt. % | 64.7 wt. % | 63.0 wt. % | 59.5 wt. % |
| NaC14 | — | — | — | — |
| NaC16 | — | — | — | — |
| NaC18 | — | — | — | — |
| % CA | 97.5 wt. % | 92.5 wt. % | 90.0 wt. % | 85.0 wt. % |
| % Slow CA | 70.0 wt. % | 70.0 wt. % | 70.0 wt. % | 70.0 wt. % |
| Perfume capsules | 2.5 wt. % | 7.5 wt. % | 10.0 wt. % | 15.0 wt. % |
| | | Dissolution Performance | | |
| $M_S$ | 9.6 mg | 10.6 mg | 11.2 mg | 11.0 mg |
| T | 25° C. | 25° C. | 25° C. | 25° C. |
| $M_A$ | 40.0% | 33.5% | 30.4% | 29.0% |

TABLE 2

| | Sample AE (inventive) | Sample AF (inventive) | Sample AG (inventive) | Sample AH (inventive) |
|---|---|---|---|---|
| | | SDCM | | |
| 1) Water | 37.082 g | 36.471 g | 35.370 g | 34.234 g |
| 2) NaC8 | — | — | — | — |
| 3) NaC10 | 5.004 g | 5.003 g | 5.006 g | 5.001 g |
| 4) NaC12 | 7.502 g | 7.501 g | 7.503 g | 7.501 g |
| 5) NaC14 | — | — | — | — |
| 6) NaC16 | — | — | — | — |
| 7) NaC18 | — | — | — | — |
| % CA | 25.0 wt. % | 25.0 wt. % | 25.0 wt. % | 25.0 wt. % |
| 8) Perfume capsule slurry | 0.44 g | 1.050 g | 2.135 g | 3.278 g |
| | | SDC | | |
| NaC8 | — | — | — | — |
| NaC10 | 39.6 wt. % | 39.0 wt. % | 38.0 wt. % | 37.0 wt. % |
| NaC12 | 59.3 wt. % | 58.5 wt. % | 57.0 wt. % | 55.5 wt. % |
| NaC14 | — | — | — | — |
| NaC16 | — | — | — | — |
| NaC18 | — | — | — | — |
| % CA | 98.9 wt. % | 97.5 wt. % | 95.0 wt. % | 92.5 wt. % |
| % Slow CA | 60 wt. % | 60 wt. % | 60 wt. % | 60 wt. % |
| Perfume capsules | 1.1 wt. % | 2.5 wt. % | 5.0 wt. % | 7.5 wt. % |
| | | Dissolution Performance | | |
| Ms | 10.2 mg | 10.6 mg | 10.7 mg | 10.8 mg |
| T | 25° C. | 25° C. | 25° C. | 25° C. |
| $M_A$ | 53.0% | 47.7% | 52.7% | 50.1% |

TABLE 3

| | Sample AI (inventive) | Sample AJ (inventive) | Sample AK (inventive) | Sample AL (inventive) |
|---|---|---|---|---|
| SCDM | | | | |
| 1) Water | 33.030 g | 31.733 g | 30.380 g | 28.939 g |
| 2) NaC8 | | | | — |
| 3) NaC10 | 5.008 g | 5.008 g | 5.005 g | 5.005 g |
| 4) NaC12 | 7.503 g | 7.490 g | 7.501 g | 7.509 g |
| 5) NaC14 | — | — | — | — |
| 6) NaC16 | — | — | — | — |
| 7) NaC18 | — | — | — | — |
| % CA | 25.0 wt. % | 25.0 wt. % | 25.0 wt. % | 25.0 wt. % |
| 8) Perfume capsules slurry | 4.482 g | 5.775 g | 7.140 g | 8.568 g |
| SDC | | | | |
| NaC8 | — | — | — | — |
| NaC10 | 36.0 wt. % | 35.0 wt. % | 34.0 wt. % | 33.0 wt. % |
| NaC12 | 54.0 wt. % | 52.5 wt. % | 51.0 wt. % | 49.5 wt. % |
| NaC14 | — | — | — | — |
| NaC16 | — | — | — | — |
| NaC18 | — | — | — | — |
| % CA | 90.0 wt. % | 87.5 wt. % | 85.0 wt. % | 82.5 wt. % |
| % Slow CA | 60 wt. % | 60 wt. % | 60 wt. % | 60 wt. % |
| Perfume capsules | 10.0 wt. % | 12.5 wt. % | 15.0 wt. % | 17.5 wt. % |
| Dissolution Performance | | | | |
| $M_S$ | 11.5 mg | 12.1 mg | 10.9 mg | 11.7 mg |
| T | 25° C. | 25° C. | 25° C. | 25° C. |
| $M_A$ | 49.3% | 46.0% | 50.9% | 44.7% |

Example 2

EXAMPLE 2 shows fast-dissolving inventive compositions with different levels of neat perfume. Such combinations offer consumers extraordinary wet fabric freshness. The example offers several approaches of adding neat perfumes to increase perfume loading.

Samples BA-BG (TABLE 4, TABLE 5) show inventive compositions that form mesh microstructure when emulsifying neat perfume in the Mixing step. Samples BA-BF are prepared by Forming through crystallizing the crystallizing agent. Unexpectedly, Sample BG (TABLE 5) is prepared by Forming by partial drying of the composition as it does not crystallize at 4° C. when emulsifying over about 12.7 wt. % perfume. Sample BH-BK (TABLE 6) show the compositions are prepared by Forming through crystallization in the absence of emulsified neat perfume, and further prepared by Drying where perfume can be post-added to create a viable SDC, even at levels much greater than 15 wt. % perfume. The samples contain between 25-30 wt. % crystallizing agent in the SDCM and between about 29.0 wt. % and 99.0 wt. % in the final SDC composition.

Preparation of the Solid Dissolvable Composition

Sample BA-BG were prepared in the following fashion.

(Mixing) A 250-ml stainless steel beaker (Thermo Fischer Scientific, Waltham, MA.) was placed on a hot plate (VWR, Radnor, PA, 7×7 CER Hotplate, cat. no. NO97042-690). Water (Milli-Q Academic) and crystallizing agents were added to the beaker. A temperature probe was placed into composition. A mixing device comprising an overhead mixer (IKA Works Inc, Wilmington, NC, model RW20 DMZ) and a three-blade impeller design was assembled, with the impeller placed in the composition. The heater was set at 80° C., the impeller was set to rotate at 250 rpm and the composition was heated to 80° C. until all the crystallizing agent was solubilized and the composition was clear. The composition was then poured into a Max 100 Mid Cup, capped, and allowed to cool to 25° C. Neat perfume was added to the cooled solution and homogenized into the composition using a Speedmixer (Flack Tek. Inc, Landrum, SC, model DAC 150.1 FVZ-K) at a rate of 3000 rpm for 3 minutes. The composition was transferred to polymer mold containing a pattern of 5 mm diameter hemispheres, evenly dispersed using a rubber baking spatula, and excess materials was scraped from the top of the mold.

(Forming) The mold was placed in a refrigerator (VWR Door Solid Lock F Refrigerator 115V, 76300-508, or equivalent) equilibrated to 4° C. for 24 hours allowing the crystallizing agent to crystallize. If the composition did not crystallize, it must be partially dried until crystallization occurred.

(Drying) If the preparation crystallizes, the molds were placed in a convection oven (Yamato, DKN400, or equivalent) set to 25° C. with air circulating for another 24 hours. The SDC were then removed from the mold and collected. The beads were less than 5 wt. % water, as measured by MOISTURE TEST METHOD.

Sample BH-BK were prepared with the same procedure, except the neat perfume is omitted during the Mixing stage of the preparation, being added instead after the drying stage and resulting SDC were removed from the mold and collected. In these non-limiting cases, Sample BH was prepared by adding small drops of neat perfume three different times to the flat side of the form. Sample BI was prepared by adding small drops of neat perfume three different times to the round side of the form. Sample BJ was prepared by spraying/spritzing small amounts of perfume on the form. Finally, Sample BK was prepared by brushing small drops of neat perfume two different times to the round side of the form.

TABLE 4

| | Sample BA (inventive) | Sample BB (inventive) | Sample BC (inventive) | Sample BD (inventive) |
|---|---|---|---|---|
| SDCM | | | | |
| 1) Water | 37.380 g | 37.210 g | 36.842 g | 36.496 g |
| 2) NaC8 | — | — | — | — |
| 3) NaC10 | 5.006 g | 5.006 g | 5.009 g | 5.007 g |
| 4) NaC12 | 7.501 g | 7.503 g | 7.502 g | 7.505 g |
| 5) NaC14 | — | — | — | — |
| 6) NaC16 | — | — | — | — |
| 7) NaC18 | — | — | — | — |
| % CA | 25.0 wt. % | 25.0 wt. % | 25.0 wt. % | 25.0 wt. % |
| 9) Perfume | 0.130 g | 0.330 g | 0.668 g | 1.020 g |
| SDC | | | | |
| NaC8 | — | — | — | — |
| NaC10 | 39.6 wt. % | 39.0 wt. % | 38.0 wt. % | 37.0 wt. % |
| NaC12 | 59.4 wt. % | 58.4 wt. % | 57.0 wt. % | 55.5 wt. % |
| NaC14 | — | — | — | — |
| NaC16 | — | — | — | — |
| NaC18 | — | — | — | — |
| % CA | 99.0 wt. % | 97.4 wt. % | 95.0 wt. % | 92.5 wt. % |
| % Slow CA | 60.0 wt. % | 60.0 wt. % | 60.0 wt. % | 60.0 wt. % |
| Perfume | 1.0 wt. % | 2.6 wt. % | 5.0 wt. % | 7.5 wt. % |
| Dissolution Performance | | | | |
| $M_S$ | 10.4 mg | 10.0 mg | 9.9 mg | 9.5 mg |
| T | 25° C. | 25° C. | 25° C. | 25° C. |
| $M_A$ | 69.6% | 69.9% | 75.7% | 78.1% |

TABLE 5

| | Sample BE (inventive) | Sample BF (inventive) | Sample BG (inventive) |
|---|---|---|---|
| SDCM | | | |
| 1) Water | 36.116 g | 35.721 g | 35.288 g |
| 2) NaC8 | — | — | — |
| 3) NaC10 | 5.009 g | 5.006 g | 5.008 g |
| 4) NaC12 | 7.500 g | 7.513 g | 7.500 g |
| 5) NaC14 | — | — | — |
| 6) NaC16 | — | — | — |
| 7) NaC18 | — | — | — |
| % CA | 25.7 wt. % | 26.0 wt. % | 25.0 wt. % |
| 9) Perfume | 1.399 g | 1.809 g | 2.210 g |
| SDC | | | |
| NaC8 | — | — | — |
| NaC10 | 36.0 wt. % | 34.9 wt. % | 34.0 wt. % |

TABLE 5-continued

| | Sample BE (inventive) | Sample BF (inventive) | Sample BG (inventive) |
|---|---|---|---|
| NaC12 | 54.0 wt. % | 52.4 wt. % | 51.0 wt. % |
| NaC14 | — | — | — |
| NaC16 | — | — | — |
| NaC18 | — | — | — |
| % CA | 90.0 wt. % | 87.3 wt. % | 85.0 wt. % |
| % Slow CA | 60.0 wt. % | 60.0 wt. % | 60.0 wt. % |
| Perfume | 10.0 wt. % | 12.7 wt. % | 15.0 wt. % |
| Dissolution Performance | | | |
| $M_S$ | 10.1 mg | 10.0 mg | NM |
| T | 25° C. | 25° C. | NM |
| $M_A$ | 74.6% | 80.2% | NM |

TABLE 6

| | Sample BH (inventive) Drop Flat Side | Sample BI (inventive) Drop Round Side | Sample BJ (inventive) Spray/Spritz | Sample BK (inventive) Brush |
|---|---|---|---|---|
| SDCM (wet) | | | | |
| 1) Water | 35.002 g | 35.002 g | 35.002 g | 35.002 g |
| 2) NaC8 | — | — | — | — |
| 3) NaC10 | 6.004 g | 6.004 g | 6.004 g | 6.004 g |
| 4) NaC12 | 9.004 g | 9.004 g | 9.004 g | 9.004 g |
| 5) NaC14 | — | — | — | — |
| 6) NaC16 | — | — | — | — |
| 7) NaC18 | — | — | — | — |
| % CA | 30.0 wt. % | 30.0 wt. % | 30.0 wt. % | 30.0 wt. % |
| SDC (dry) | | | | |
| NaC8 | — | — | — | — |
| NaC10 | (1) 28.4 wt. %<br>(2) 23.3 wt. %<br>(3) 16.8 wt. % | (1) 27.5 wt. %<br>(2) 23.2 wt. %<br>(3) 16.6 wt. % | 8.8 wt. % | (1) 29.1 wt. %<br>(2) 21.2 wt. % |
| NaC12 | (1) 65.3 wt. %<br>(2) 52.7 wt. %<br>(3) 38.5 wt. % | (1) 63.3 wt. %<br>(2) 53.4 wt. %<br>(3) 38.2 wt. % | 20.2 wt. % | (1) 66.9 wt. %<br>(2) 49.0 wt. % |

TABLE 6-continued

| | Sample BH (inventive) Drop Flat Side | Sample BI (inventive) Drop Round Side | Sample BJ (inventive) Spray/Spritz | Sample BK (inventive) Brush |
|---|---|---|---|---|
| NaC14 | — | — | — | — |
| NaC16 | — | — | — | — |
| NaC18 | — | — | — | — |
| % CA | (1) 93.7 wt. %<br>(2) 77.0 wt. %<br>(3) 55.3 wt. % | (1) 90.7 wt. %<br>(2) 76.6 wt. %<br>(3) 54.8 wt. % | 29.0 wt. % | (1) 96.0 wt. %<br>(2) 70.2 wt. % |
| % Slow CA | 30.3 wt. % | 30.3 wt. % | 30.3 wt. % | 30.3 wt. % |
| 9) Perfume | (1) 1 μL-0.0008 g<br>(2) 3 μL-0.0035 g<br>(3) 10 μL-0.0101 g | (1) 1 μL-0.0012 g<br>(2) 3 μL-0.0036 g<br>(3) 10 μL-0.0103 g | 0.0319 g | (1) 1Brush - 0.0005 g<br>(2) 3Brush - 0.0053 g |
| % Perfume (dry) | (1) 6.3 wt. %<br>(2) 23.0 wt. %<br>(3) 44.7 wt. % | (1) 9.2 wt. %<br>(2) 23.3 wt. %<br>(3) 45.2 wt. % | 71.0 wt. % | (1) 4.0 wt. %<br>(2) 29.8 wt. % |
| Dissolution Performance | | | | |
| $M_S$ | (1) 0.0120 g<br>(2) 0.0117 g<br>(3) 0.0125 g | (1) 0.0118 g<br>(2) 0.0121 g<br>(3) 0.0125 g | 0.0130 g | (1) 0.0120 g<br>(2) 0.0125 g |
| T | NM | NM | NM | NM |
| $M_A$ | NM | NM | NM | NM |

Example 3

EXAMPLE 3 shows inventive compositions with different short chain length combinations of crystallizing agents. Such combinations offer consumers compositions that dissolve at different times in the wash cycle, to optimize the fabric freshness performance. The perfume and perfume capsule active agents were added after Drying.

Samples CA-CD (TABLE 7) were created from only one single chain length of crystallizing agent. While these four samples are all created through Mixing the crystallizing agent in water, Forming in CB-CD was done by crystallization in the refrigerator at 4° C. and Sample CA was done by partial drying and then Forming Samples in the refrigerator at 4° C. These compositions demonstrate a wide range of different dissolution with time and temperature, to enable active release at different times in the wash cycle and different wash conditions. The samples contain between 20 wt. % and 35 wt. % crystallizing agent in the SDCM.

Samples CE-CO (TABLE 8, TABLE 9, TABLE 10) were created from blends of C10 and C12 chain length crystallizing agent, over a much large range than in EXAMPLE 1 and EXAMPLE 2. Forming in all composition except CO were done by crystallization at 4° C. Forming in Sample CO was done by partial drying followed by crystallization at 4° C. These samples demonstrate that careful blending of the chain length of the crystallizing agent achieved very different dissolution of between 18.4% and 86.0% as determined by the DISSOLUTION TEST METHOD. The samples contain between 7.0 wt. % and 35 wt. % crystallizing agent in the SDCM.

Samples CQ-CR (Table 11) were created from blends of C8 and C12 chain length crystallizing agent, also over a much large range than in EXAMPLE 1 and EXAMPLE 2. Forming in Sample CQ and Sample CR was done by crystallization at 4° C. Forming in Sample CS and sample CT was done by partial drying followed by crystallization at 4° C. Careful blending of the chain length of the crystallizing agent achieved very different dissolution of between 29.4% and 45.3% as determined by the DISSOLUTION TEST METHOD. The samples contain between 15 wt. % and 35 wt. % crystallizing agent in the SDCM.

Preparation of the Solid Dissolvable Composition

The compositions were prepared in the following fashion.

(Mixing) A 250-ml stainless steel beaker (Thermo Fischer Scientific, Waltham, MA.) was placed on a hot plate (VWR, Radnor, PA, 7×7 CER Hotplate, cat. No. NO97042-690). Water (Milli-Q Academic) and crystallizing agents were added to the beaker. A temperature probe was placed into composition. A mixing device comprising an overhead mixer (IKA Works Inc, Wilmington, NC, model RW20 DMZ) and a three-blade impeller design was assembled, with the impeller placed in the composition. The heater was set at 80° C., the impeller was set to rotate at 250 rpm and the composition was heated to 80° C. until all the crystallizing agent was solubilized and the composition was clear. The composition was then poured into a Max 100 Mid Cup, capped, and allowed to cool to 25° C. The composition was transferred to polymer mold containing a pattern of 5 mm diameter hemispheres, evenly dispersed using a rubber baking spatula, and excess materials was scraped from the top of the mold.

(Forming) The mold was placed in a refrigerator (VWR Door Solid Lock F Refrigerator 115V, 76300-508, or equivalent) equilibrated to 4° C. for 24 hours allowing the crystallizing agent to crystallize. If the composition did not crystallize, they were partially dried by blowing air over the compositions to remove some water and then crystallizing at 4° C.

(Drying) If the preparation crystallizes, the molds were placed in a convection oven (Yamato, DKN400, or equivalent) for another 24 hours. The beads were then removed from the mold and collected. The beads were less than 5 wt. % water, as measured by MOISTURE TEST METHOD.

TABLE 7

| | Sample CA (inventive) | Sample CB (inventive) | Sample CC (inventive) | Sample CD (inventive) |
|---|---|---|---|---|
| | | SDCM | | |
| 1) Water | 32.503 g | 32.509 g | 80.012 g | 80.012 g |
| 2) NaC8 | 17.505 g | — | — | — |
| 3) NaC10 | — | 17.502 g | — | — |
| 4) NaC12 | — | — | 20.008 g | 20.008 g |
| 5) NaC14 | — | — | — | — |
| 6) NaC16 | — | — | — | — |
| 7) NaC18 | — | — | — | — |
| % CA | 35.0 wt. % | 35.0 wt. % | 20.0 wt. % | 20.0 wt. % |
| | | SDC | | |
| NaC8 | 100.0 wt. % | — | — | — |
| NaC10 | — | 100.0 wt. % | — | — |
| NaC12 | — | — | 100.0 wt. % | 100.0 wt. % |
| NaC14 | — | — | — | — |
| NaC16 | — | — | — | — |
| NaC18 | — | — | — | — |
| % CA | 100.0 wt. % | 100.0 wt. % | 100.0 wt. % | 100.0 wt. % |
| % Slow CA | — | — | — | — |
| | | Dissolution Performance | | |
| $M_S$ | NM | 13.5 mg | 7.8 mg | 7.5 mg |
| T | NM | 25° C. | 25° C. | 37° C. |
| $M_A$ | NM | 67.2% | 15.0% | 72.7% |

TABLE 8

| | Sample CE (inventive) | Sample CF (inventive) | Sample CG (inventive) |
|---|---|---|---|
| | SDCM | | |
| 1) Water | 35.004 g | 37.509 g | 35.008 g |
| 2) NaC8 | — | — | — |
| 3) NaC10 | 4.508 g | 5.005 g | 7.500 g |
| 4) NaC12 | 10.500 g | 7.503 g | 7.501 g |
| 5) NaC14 | — | — | — |
| 6) NaC16 | — | — | — |
| 7) NaC18 | — | — | — |
| % CA | 30.0 wt. % | 25.0 wt. % | 30.0 wt. % |
| | SDC | | |
| NaC8 | — | — | — |
| NaC10 | 30.0 wt. % | 40.0 wt. % | 50.0 wt. % |
| NaC12 | 70.0 wt. % | 60.0 wt. % | 50.0 wt. % |
| NaC14 | — | — | — |
| NaC16 | — | — | — |
| NaC18 | — | — | — |
| % CA | 100.0 wt. % | 100.0 % wt. % | 100.0 wt. % |
| % Slow CA | 70.0 wt. % | 60.0 wt. % | 50.0 wt. % |
| | Dissolution Performance | | |
| $M_S$ | 11.8 mg | 11.1 mg | 12.1 mg |
| T | 25° C. | 25° C. | 25° C. |
| $M_A$ | 44.3% | 60.8% | 72.1% |

TABLE 9

| | Sample CH (inventive) | Sample CI (inventive) | Sample CJ (inventive) | Sample CK (inventive) |
|---|---|---|---|---|
| | | SDCM | | |
| 1) Water | 35.009 g | 35.009 g | 32.503 g | 37.499 g |
| 2) NaC8 | — | — | — | — |
| 3) NaC10 | 3.001 g | 1.502 g | 10.499 g | 7.501 g |
| 4) NaC12 | 12.001 g | 13.506 g | 7.003 g | 5.004 g |
| 5) NaC14 | — | — | — | — |
| 6) NaC16 | — | — | — | — |
| 7) NaC18 | — | — | — | — |
| % CA | 30.0 wt. % | 30.0 wt. % | 35.0 wt. % | 25.0 wt. % |
| | | SDC | | |
| NaC8 | — | — | — | — |
| NaC10 | 20.0 wt. % | 10.0 wt. % | 60.0 wt. % | 60.0 wt. % |
| NaC12 | 80.0 wt. % | 90.0 wt. % | 40.0 wt. % | 40.0 wt. % |
| NaC14 | — | — | — | — |
| NaC16 | — | — | — | — |
| NaC18 | — | — | — | — |
| % CA | 100.0 wt. % | 100.0 wt. % | 100.0 wt. % | 100.0 wt. % |
| % Slow CA | 80.0 wt. % | 90.0 wt. % | 40.0 wt. % | 40.0 wt. % |

TABLE 9-continued

| | Sample CH (inventive) | Sample CI (inventive) | Sample CJ (inventive) | Sample CK (inventive) |
|---|---|---|---|---|
| Dissolution Performance | | | | |
| $M_S$ | 11.1 mg | 11.5 mg | 12.9 mg | 9.5 mg |
| T | 25° C. | 25° C. | 25° C. | 25° C. |
| $M_A$ | 30.4% | 18.4% | 67.5% | 72.7% |

TABLE 10

| | Sample CL (inventive) | Sample CM (inventive) | Sample CN (inventive) | Sample CO (inventive) |
|---|---|---|---|---|
| SDCM | | | | |
| 1) Water | 42.5 g | 45.000 g | 46.504 g | 43.750 g |
| 2) NaC8 | — | — | — | — |
| 3) NaC10 | 2.253 g | 1.505 g | 1.051 g | 3.135 g |
| 4) NaC12 | 5.255 g | 3.501 g | 2.450 g | 3.137 g |
| 5) NaC14 | — | — | — | — |
| 6) NaC16 | — | — | — | — |
| 7) NaC18 | — | — | — | — |
| % CA | 15.0 wt. % | 10.0 wt. % | 7.0 wt. % | 12.5 wt. % |
| SDC | | | | |
| NaC8 | — | — | — | — |
| NaC10 | 30.0 wt. % | 30.0 wt. % | 30.0 wt. % | 50.0 wt. % |
| NaC12 | 70.0 wt. % | 70.0 wt. % | 70.0 wt. % | 50.0 wt. % |
| NaC14 | — | — | — | — |
| NaC16 | — | — | — | — |
| NaC18 | — | — | — | — |
| % CA | 100.0 wt. % | 100.0 wt. % | 100.0 wt. % | 100.0 wt. % |
| % Slow CA | 70.0 wt. % | 70.0 wt. % | 70.0 wt. % | 50.0 wt. % |
| Dissolution Performance | | | | |
| $M_S$ | 6.5 mg | 3.9 mg | 3.1 mg | NM |
| T | 25° C. | 25° C. | 25° C. | NM |
| $M_A$ | 48.6% | 77.2% | 86.0% | NM |

TABLE 11

| | Sample CQ (inventive) | Sample CR (inventive) | Sample CS (inventive) | Sample CT (inventive) |
|---|---|---|---|---|
| SDCM | | | | |
| 1) Water | 32.509 g | 40.003 g | 42.500 g | 45.003 g |
| 2) NaC8 | 7.004 g | 5.006 g | 4.502 g | 3.500 g |
| 3) NaC10 | — | — | — | — |
| 4) NaC12 | 10.504 g | 5.001 g | 3.007 g | 1.507 g |
| 5) NaC14 | — | — | — | — |
| 6) NaC16 | — | — | — | — |
| 7) NaC18 | — | — | — | — |
| % CA | 35.0 wt. % | 20.0 wt. % | 15.0 wt. % | 10.0 wt. % |
| SDC | | | | |
| NaC8 | 40.0 wt. % | 50.0 wt. % | 60.0 wt. % | 70.0 wt. % |
| NaC10 | — | — | — | — |
| NaC12 | 60.0 wt. % | 50.0 wt. % | 40.0 wt. % | 30.0 wt. % |
| NaC14 | — | — | — | — |
| NaC16 | — | — | — | — |
| NaC18 | — | — | — | — |
| % CA | 100.0 wt. % | 100.0 wt. % | 100.0 wt. % | 100.0 wt. % |
| % Slow CA | 60.0 wt. % | 50.0 wt. % | 40.0 wt. % | 30.0 wt. % |
| Dissolution Performance | | | | |
| $M_S$ | 12.6 mg | 9.9 g | NM | NM |
| T | 25° C. | 25° C. | NM | NM |
| $M_A$ | 29.4% | 45.3% | NM | NM |

Example 4

EXAMPLE 4 shows comparative compositions with long chain length crystallizing agents. The perfume and perfume capsule active agents were added after Drying. Such compositions do not dissolve completely in a wash cycle.

Samples DA-DC (TABLE 12) contain comparative composition containing long chain length sodium fatty acid carboxylate crystallizing agents. Sample DA contains C14, Sample DB contains C16, and Sample DC contains C18. Forming in all these compositions was done by crystallization at 4° C.

All the samples have very low dissolution rate as measured by the DISSOLUTION TEST METHOD. In fact, no average percent of mass loss was measured at 25° C. The measurements were repeated and reported at 37° C.—more favorable to temperature to increase the dissolution rate, which only showed an average percent of mass loss less than 5% in each case. Net, even under the most favorable was conditions for solubilization, these combinations are not viable for complete dissolution during a wash cycle. In fact, washer test done with these compositions resulted in hundreds of insolubilized particulate compositions scattered throughout the washer.

Preparation of the Solid Dissolvable Composition

The compositions were prepared in the following fashion.

(Mixing) A 250-ml stainless steel beaker (Thermo Fischer Scientific, Waltham, MA.) was placed on a hot plate (VWR, Radnor, PA, 7×7 CER Hotplate, cat. No. NO97042-690). Water (Milli-Q Academic) and crystallizing agents were added to the beaker. A temperature probe was placed into composition. A mixing device comprising an overhead mixer (IKA Works Inc, Wilmington, NC, model RW20 DMZ) and a three-blade impeller design was assembled, with the impeller placed in the composition. The heater was set at 80° C., the impeller was set to rotate at 250 rpm and the composition was heated to 80° C. until all the crystallizing agent was solubilized and the composition was clear. The composition was then poured into a Max 100 Mid Cup, capped and allowed to cool to 25° C. The composition was transferred to polymer mold containing a pattern of 5 mm diameter hemispheres, evenly dispersed using a rubber baking spatula, and excess materials was scraped from the top of the mold.

(Forming) The mold was placed in a refrigerator (VWR Door Solid Lock F Refrigerator 115V, 76300-508, or equivalent) equilibrated to 4° C. for 24 hours allowing the crystallizing agent to crystallize.

(Drying) The molds were placed in a convection oven (Yamato, DKN400, or equivalent) for another 24 hours. The beads were then removed from the mold and collected. The beads were less than 5 wt. % water, as measured by MOISTURE TEST METHOD.

TABLE 12

| | Sample DA (comparative) | Sample DB (comparative) | Sample DC (comparative) |
|---|---|---|---|
| SDCM (wet) | | | |
| 1) Water | 80.057 g | 80.026 g | 90.002 g |
| 2) NaC8 | — | — | — |
| 3) NaC10 | — | — | — |
| 4) NaC12 | — | — | — |
| 5) NaC14 | 20.003 g | — | — |
| 6) NaC16 | — | 20.000 g | — |
| 7) NaC18 | — | — | 10.008 g |
| % CA | 20.0 wt. % | 20.0 wt. % | 10.0 wt. % |
| SDC (wet) | | | |
| NaC8 | — | — | — |
| NaC10 | — | — | — |
| NaC12 | — | — | — |
| NaC14 | 100 wt. % | — | — |
| NaC16 | — | 100.0 wt. % | — |
| NaC18 | — | — | 100.0 wt. % |
| % CA | 0.0 wt. % | 0.0 wt. % | 0.0 wt. % |
| % Slow CA | — | — | — |
| Dissolution Performance | | | |
| $M_S$ | 8.2 mg | 6.3 mg | 4.1 mg |
| T | 37° C. | 37° C. | 37° C. |
| $M_A$ | 2.7% | 2.0% | 4.2% |

Example 5

EXAMPLE 5 shows non-limiting inventive samples with blends of perfume capsules and neat perfumes at various levels. Such combinations offer consumers a holistic freshness opportunity—with both dry and wet fabric freshness, within a single SDC composition.

Sample EA has a low level of both perfume and perfume capsules. Sample EB has high level of perfume and low level of perfume capsules to enhance wet fabric freshness. Sample EC has low level of perfume and high level of perfume capsules to enhance long term fabric freshness. Sample ED has a high level of both perfume and perfume capsules to accommodate scent-seeking consumers that seek strong freshness products. The samples contain about 25 wt. % crystallizing agent in the SDCM.

Preparation of the Solid Dissolvable Composition

The compositions were prepared in the following fashion.

(Mixing) A 250-ml stainless steel beaker (Thermo Fischer Scientific, Waltham, MA.) was placed on a hot plate (VWR, Radnor, PA, 7×7 CER Hotplate, cat. No. NO97042-690). Water (Milli-Q Academic) and crystallizing agents were added to the beaker. A temperature probe was placed into composition. A mixing device comprising an overhead mixer (IKA Works Inc, Wilmington, NC, model RW20 DMZ) and a three-blade impeller design was assembled, with the impeller placed in the composition. The heater was set at 80° C., the impeller was set to rotate at 250 rpm and the composition was heated to 80° C. until all the crystallizing agent was solubilized and the composition was clear. The composition was then poured into a Max 100 Mid Cup, capped and allowed to cool to 25° C. Perfume capsules and neat perfume were added to the cooled solution and homogenized into the composition using a Speedmixer (Flack Tek. Inc, Landrum, SC, model DAC 150.1 FVZ-K) at a rate of 2700 rpm for 3 minutes. The composition was transferred to polymer mold containing a pattern of 5 mm diameter hemispheres, evenly dispersed using a rubber baking spatula, and excess materials was scraped from the top of the mold.

(Forming) The mold was placed in a refrigerator (VWR Door Solid Lock F Refrigerator 115V, 76300-508, or equivalent) equilibrated to 4° C. for 24 hours allowing the crystallizing agent to crystallize.

(Drying) The molds were placed in a convection oven (Yamato, DKN400, or equivalent) for another 24 hours. The beads were then removed from the mold and collected. The beads were less than 5 wt. % water, as measured by MOISTURE TEST METHOD.

TABLE 13

| | Sample EA (inventive) | Sample EB (inventive) | Sample EC (inventive) | Sample ED (inventive) |
|---|---|---|---|---|
| SDCM | | | | |
| 1) Water | 36.957 g | 35.232 g | 30.138 g | 29.287 g |
| 2) NaC8 | — | — | — | — |
| 3) NaC10 | 5.007 g | 5.005 g | 5.000 g | 4.506 g |
| 4) NaC12 | 7.499 g | 7.504 g | 7.506 g | 6.754 g |
| 5) NaC14 | — | — | — | — |
| 6) NaC16 | — | — | — | — |
| 7) NaC18 | — | — | — | — |
| % CA | 25.3 wt. % | 26.2 wt. % | 29.3 wt. % | 27.8.5 wt. % |
| 8) Perfume capsule slurry | 0.427 g | 0.480 g | 7.216 g | 7.560 g |
| 9) Perfume | 0.135 g | 1.811 g | 0.166 g | 1.970 g |
| SDC | | | | |
| NaC8 | — | — | — | — |
| NaC10 | 39.2 wt. % | 34.6 wt. % | 33.5 wt. % | 28.9 wt. % |
| NaC12 | 58.7 wt. % | 51.9 wt. % | 50.3 wt. % | 43.4 wt. % |
| NaC14 | — | — | — | — |
| NaC16 | — | — | — | — |
| NaC18 | — | — | — | — |
| % CA | 97.9 wt. % | 86.5 wt. % | 83.8 wt. % | 72.3 wt. % |
| % Slow CA | 60.0 wt. % | 60.0 wt. % | 60.0 wt. % | 60.0 wt. % |
| Perfume capsules | 1.0 wt. % | 1.0 wt. % | 15.0 wt. % | 15.1 wt. % |
| Perfume | 1.1 wt. % | 12.5 wt. % | 1.1 wt. % | 12.6 wt. % |
| % AA | 2.1 wt. % | 13.5 wt. % | 16.2 wt. % | 27.7 wt. % |
| Dissolution Performance | | | | |
| $M_S$ | 8.3 mg | 9.9 mg | 11.3 mg | 11.4 mg |
| T | 25° C. | 25° C. | 25° C. | 25° C. |
| $M_A$ | 53.1% | 62.0% | 42.3% | 48.9% |

Example 6

EXAMPLE 6 shows inventive compositions with different crystallizing agents, where the addition of sodium chloride was used in the Forming of the SDC. In these compositions, the perfume and perfume capsule active agents were added after Drying.

Sample FA contains only C8 chain length which is too short a chain length for Forming by crystallization at 4° C., and instead the composition is partially dried and then Forming was done by crystallizing at 4° C. Sample FB demonstrates that the same composition can be Forming directly by crystallization at 4° C. after adding sodium chloride to the composition. Sample FC and Sample FD demonstrated the same behavior, where the SDC is composed of C10 and of C10 and sodium chloride respectively.

Preparation of the Solid Dissolvable Composition

The compositions were prepared in the following fashion.

(Mixing) A 250-ml stainless steel beaker (Thermo Fisher Scientific, Waltham, MA.) was placed on a hot plate (VWR, Radnor, PA, 7×7 CER Hotplate, cat. no. NO97042-690). Water (Milli-Q Academic) and crystallizing agents were added to the beaker. A temperature probe was placed into composition. A mixing device comprising an overhead mixer (IKA Works Inc, Wilmington, NC, model RW20 DMZ) and a three-blade impeller design was assembled, with the impeller placed in the composition. The heater was set at 80° C., the impeller was set to rotate at 250 rpm and the composition was heated to 80° C. until all the crystallizing agent was solubilized and the composition was clear. The composition was then poured into a Max 100 Mid Cup, capped and allowed to cool to 25° C. Perfume capsules were added to the cooled solution and homogenized into the composition using a Speedmixer (Flack Tek. Inc, Landrum, SC, model DAC 150.1 FVZ-K) at a rate of 2700 rpm for 3 minutes. The composition was transferred to polymer mold containing a pattern of 5 mm diameter hemispheres, evenly dispersed using a rubber baking spatula, and excess materials was scraped from the top of the mold.

(Forming) Forming by crystallization was done in mold which was placed in a refrigerator (VWR Door Solid Lock F Refrigerator 115V, 76300-508, or equivalent) equilibrated to 4° C. for 8 hours allowing the crystallizing agent to crystallize. Forming by partial drying and then by crystallization was done in mold on which blown air to remove some water, and then crystallized in the refrigerator.

(Drying) If the preparation crystallizes, the molds were placed in a convection oven (Yamato, DKN400, or equivalent) for another 8 hours. The beads were then removed from the mold and collected. The beads were less than 5 wt. % water, as measured by MOISTURE TEST METHOD.

TABLE 14

| | Sample FA (inventive) | Sample FB (inventive) | Sample FC (inventive) | Sample FD (inventive) |
|---|---|---|---|---|
| SDCM | | | | |
| 1) Water | 33.259 g | 33.259 g | 40.001 g | 39.514 g |
| 2) NaC8 | 15.005 g | 15.005 g | — | — |

TABLE 14-continued

| | Sample FA (inventive) | Sample FB (inventive) | Sample FC (inventive) | Sample FD (inventive) |
|---|---|---|---|---|
| 3) NaC10 | — | — | 10.002 g | 10.002 g |
| 4) NaC12 | — | — | — | — |
| 5) NaC14 | — | — | — | — |
| 6) NaC16 | — | — | — | — |
| 7) NaC18 | — | — | — | — |
| % CA | 31.0 wt. % | 30.0 wt. % | 20.0 wt. % | 20.0 wt. % |
| 10) NaCl | — | 1.749 g | — | 0.501 g |
| % NaCl | — | 3.5 wt. % | — | 1.0 wt. % |
| | | SDC | | |
| NaC8 | 100.0 wt. % | 89.6 wt. % | — | — |
| NaC10 | — | — | 100.0 wt. % | 95.2 wt. % |
| NaC12 | — | — | — | — |
| NaC14 | — | — | — | — |
| NaC16 | — | — | — | — |
| NaC18 | — | — | — | — |
| % CA | 100.0 wt. % | 89.6 wt. % | 100.0 wt. % | 95.2 wt. % |
| % Slow CA | — | — | — | — |
| NaCl | — | 10.4 wt. % | — | 4.8 wt. % |
| | | Dissolution Performance | | |
| $M_S$ | NM | 15.0 mg | NM | 8.1 mg |
| T | NM | 25° C. | NM | 25° C. |
| $M_A$ | NM | 94.2% | NM | 93.5% |

Example 7

EXAMPLE 7 shows inventive compositions prepared at pilot plant scale that enable higher levels of crystallizing agent in Forming, and where the crystallizing agent was sourced as fatty acid and neutralized with sodium hydroxide during Mixing.

Sample FE shows an inventive composition prepared in a single batch tank by Mixing fatty acid, sodium hydroxide and perfume capsules, Forming a single stream through crystallization, and Drying at ambient conditions. Sample FF shows an inventive composition preparation by Mixing by combined a stream from a fatty acid melt tank and a stream from a sodium hydroxide stream, then combining with a stream of perfume capsules slurry, Forming the final single stream through crystallization, and Drying at ambient conditions. Sample FG shows an inventive composition prepared by the same process of Sample FF, but at 38.5 wt. % crystallizing agent where Forming is achieved by viscosity build. Active agents are added after Drying. Sample FH shows an inventive composition prepared by the same process of Sample FF, but at 50.5 wt. % crystallizing agent where Forming is achieved by viscosity build Active agents are added after Drying. The samples contain between about 26 wt. % and 50 wt. % crystallizing agent in the SDCM.

In these samples, the C8 and C10 come from the fatty acid raw material (11).

TABLE 15

| | Sample FE (inventive) | Sample FF (inventive) | Sample FG (inventive) | Sample FH (inventive) |
|---|---|---|---|---|
| | | SCDM Tank 1 | | |
| 1) Water | 5687.2 g | — | | |
| 11) HC8 | 516.6 g | 596.1 g | 756.4 g | 1011.8 g |
| 11) HC10 | 444.6 g | 455.0 g | 590.0 g | 789.1 g |
| 12) HC12 | 1560.0 g | 1622.0 g | 2076.7 g | 2777.9 g |
| 13) NaOH (50%) | 515.5 g | — | | |
| 9) Perfume capsules slurry | 1480.7 g | 1709.7 g | — | — |
| | | Tank 2 | | |
| 1) Water | — | 4427.6 g | 5043.5 g | 3369.8 g |
| 8) NaOH (50%) | — | 1189.6 g | 1526.0 g | 2041.2 g |
| | | Tank 3 | | |
| 9) Perfume capsules slurry | — | 1709.7 g | — | — |
| % CA | 26.0 wt. % | 30.0 wt. % | 38.5 wt. % | 50.5 wt. % |
| | | SDC | | |
| NaC8 | 19.5 wt. % | 19.5 wt. % | 22.6 wt. % | 22.6 wt. % |
| NaC10 | 14.5 wt. % | 14.5 wt. % | 17.3 wt. % | 17.3 wt. % |
| NaC12 | 51.0 wt. % | 51.0 wt. % | 59.9 wt. % | 59.9 wt. % |
| NaC14 | — | — | — | — |
| NaC16 | — | — | — | — |
| NaC18 | — | — | — | — |

TABLE 15-continued

| | Sample FE (inventive) | Sample FF (inventive) | Sample FG (inventive) | Sample FH (inventive) |
|---|---|---|---|---|
| % CA | 85.0 wt. % | 85.0 wt. % | 100 wt. % | 100 wt. % |
| % Slow CA | 60 wt. % | 60 wt. % | 60 wt. % | 60 wt. % |
| Perfume capsules | 15.0 wt. % | 15.0 wt. % | — | — |

Example 8

EXAMPLE 8 shows inventive compositions with perfume capsule with different capsule chemistries. The ability to prepare inventive compositions with different wall chemistries, enable consumer a wider variety of freshness character.

Sample FI is prepared with perfume capsule with a polyacrylate wall chemistry. Sample FJ is prepared with perfume capsule with an wall chemistry. Sample FK is prepared with perfume capsule with a chitosan wall chemistry. Sample FL is prepared with perfume capsule with a silica wall chemistry.

Preparation of the Solid Dissolvable Composition

The compositions were prepared in the following fashion.

(Mixing) A 250-ml stainless steel beaker (Thermo Fisher Scientific, Waltham, MA.) was placed on a hot plate (VWR, Radnor, PA, 7×7 CER Hotplate, cat. no. NO97042-690). Water (Milli-Q Academic) and crystallizing agents were added to the beaker. A temperature probe was placed into a composition. A mixing device comprising an overhead mixer (IKA Works Inc, Wilmington, NC, model RW20 DMZ) and a three-blade impeller design was assembled, with the impeller placed in the composition. The heater was set at 45° C., the impeller was set to rotate at 250 rpm and the composition was heated to 45° C. until all the crystallizing agent was solubilized and the composition was clear. The composition was then poured into a Max 100 Mid Cup, capped and allowed to cool to 25° C. Perfume capsules were added to the cooled solution and homogenized into the composition using a Speedmixer (Flack Tek. Inc, Landrum, SC, model DAC 150.1 FVZ-K) at a rate of 2700 rpm for 3 minutes. The composition was transferred to polymer mold containing a pattern of 5 mm diameter hemispheres, evenly dispersed using a rubber baking spatula, and excess materials was scraped from the top of the mold.

(Forming) Forming by crystallization was done in mold which was placed in a refrigerator (VWR Door Solid Lock F Refrigerator 115V, 76300-508, or equivalent) equilibrated to 4° C. for 8 hours allowing the crystallizing agent to crystallize. Forming by partial drying and then by crystallization was done in mold on which blown air to remove some water, and then crystallized in the refrigerator.

(Drying) If the preparation crystallizes, the molds were placed in a convection oven (Yamato, DKN400, or equivalent) for another 8 hours. The beads were then removed from the mold and collected.

TABLE 16

| | Sample FI (inventive) | Sample FJ (inventive) | Sample FK (inventive) | Sample FL (inventive) |
|---|---|---|---|---|
| SDCM | | | | |
| 1) Water | 51.06 g | 51.06 g | 52.19 g | 25.85 g |
| 2) NaC8 | 4.52 g | 4.52 g | 5.11 g | 2.55 g |
| 3) NaC10 | 3.52 g | 3.52 g | 3.98 g | 1.99 g |

TABLE 16-continued

| | Sample FI (inventive) | Sample FJ (inventive) | Sample FK (inventive) | Sample FL (inventive) |
|---|---|---|---|---|
| 4) NaC12 | 12.41 g | 12.41 g | 14.10 g | 7.01 g |
| 5) NaC14 | — | — | — | — |
| 6) NaC16 | — | — | — | — |
| 7) NaC18 | — | — | — | — |
| % CA | 23.0 wt. % | 23.0 wt. % | 26.0 wt. % | 26.0 wt. % |
| 14) Perfume capsule slurry | 19.34 g | — | — | — |
| 15) Perfume capsule slurry | — | 19.33 g | — | — |
| 16) Perfume capsule slurry | — | — | 14.34 g | — |
| 17) Perfume capsule slurry | — | — | — | 7.43 g |
| SDC | | | | |
| NaC8 | 19.7 wt. % | 19.7 wt. % | 19.7 wt. % | 21.9 wt. % |
| NaC10 | 15.0 wt. % | 15.0 wt. % | 15.0 wt. % | 16.7 wt. % |
| NaC12 | 52.1 wt. % | 52.1 wt. % | 52.1 wt. % | 57.9 wt. % |
| NaC14 | — | — | — | — |
| NaC16 | — | — | — | — |
| NaC18 | — | — | — | — |
| % CA | 85.0 wt. % | 85.0 wt. % | 85.0 wt. % | 96.6 wt. % |
| % Slow CA | 60.0 wt. % | 60.0 wt. % | 60.0 wt. % | 60.0 wt. % |
| Perfume capsules | 15.0 wt. % | 15.0 wt. % | 15.0 wt. % | 3.4 wt. % |
| Dissolution Performance | | | | |
| $M_S$ | NM | NM | NM | NM |
| T | NM | NM | NM | NM |
| $M_A$ | NM | NM | NM | NM |

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A solid dissolvable composition comprising:

crystallizing agent;

water;

and freshness benefit agent;

wherein the crystallizing agent is the sodium salt of saturated fatty acids having from 8 to about 12 methylene groups;

wherein the freshness benefit agent comprises at least one of a neat perfume or a malodor counteractant; and wherein the sodium salt of saturated fatty acids of the crystallizing agent comprises from 50 wt. % to 70 wt. % C12, 15 wt. % to 25 wt. % C10, and 15 wt. % to 25 wt. % C8.

2. The solid dissolvable composition of claim 1, wherein the sodium salt of saturated fatty acids comprises between 30% and 80 wt. % slow crystallizing agent (% slow CA).

3. The solid dissolvable composition of claim 1, wherein the crystalizing agent is in the form of a fiber as determined by the FIBER TEST METHOD.

4. The solid dissolvable composition of claim 1, wherein the amount of water is less than 50 wt. % of the final solid dissolvable composition as determined by the MOISTURE TEST METHOD.

5. The solid dissolvable composition of claim 1, wherein the solid dissolvable composition has a dissolution rate of solubility percent greater than 5 wt. % at 37° C. as determined by the DISSOLUTION TEST METHOD.

6. The solid dissolvable composition of claim 1, where the freshness benefit agent is at least one of 3-(4-t-butylphenyl)-2-methyl propanal, 3-(4-t-butylphenyl)-propanal, 3-(4-isopropylphenyl)-2-methylpropanal, 3-(3,4-methylenedioxyphenyl)-2-methylpropanal, 2,6-dimethyl-5-heptenal, alpha-damascone, beta-damascone, gamma-damascone, beta-damascenone, 6,7-dihydro-1,1,2,3,3-pentamethyl-4(5H)-indanone, methyl-7,3-dihydro-2H-1,5-benzodioxepine-3-one, 2-[2-(4-methyl-3-cyclohexenyl-1-yl)propyl] cyclopentan-2-one, 2-sec-butylcyclohexanone, beta-dihydro ionone, linalool, ethyllinalool, tetrahydrolinalool, dihydromyrcenol, or mixtures thereof.

7. The solid dissolvable composition of claim 1, where the freshness benefit agent is encapsulated in a capsule having a wall and a core.

8. The solid dissolvable composition of claim 7, where the capsule wall comprises at least one of melamine, polyacrylamide, silicones, silica, polystyrene, polyurea, polyurethanes, polyacrylate based materials, polyacrylate esters, gelatin, styrene malic anhydride, polyamides, aromatic alcohols, polyvinyl alcohol or mixtures thereof.

9. The solid dissolvable composition of claim 7, where the capsule wall comprises reaction product of a polyisocyanate and a chitosan.

10. The solid dissolvable composition of claim 7, where the capsules have a volume-weighted median capsule size from about 1 to about 100 microns.

11. The solid dissolvable composition of claim 7, where the capsules comprise a ratio of core to shell up to 99:1 on the basis of weight.

12. The solid dissolvable composition of claim 7, where the freshness benefit agent is a mixture of a neat perfume and perfume capsules.

13. The solid dissolvable composition of claim 7, wherein the perfume capsules are present in an amount of from about 0.01 wt % to about 15 wt %, based on the total weight of the solid dissolvable composition.

14. The solid dissolvable composition of claim 1 wherein the sodium salt is at least one of sodium C8, sodium C10, or sodium C12.

15. The solid dissolvable composition of claim 1 wherein the crystallizing agent is present in an amount from about from about 50 wt % to about 99 wt %, by weight of the solid dissolvable composition.

16. The solid dissolvable composition of claim 1, wherein the stability temperature is greater than about 40° C., as determined by the THERMAL STABILITY TEST METHOD.

17. A method of producing a solid dissolvable composition comprising:

a) providing at least one of a neat perfume or a malodor counteractant;

b) mixing a solid dissolvable composition mixture, by solubilizing a crystallizing agent in water; wherein the crystallizing agent is the sodium salt of saturated fatty acids having from 8 to about 12 methylene groups, and wherein the sodium salt of saturated fatty acids of the crystallizing agent comprises from 50 wt. % to 70 wt. % C12, 15 wt. % to 25 wt. % C10, and 15 wt. % to 25 wt. % C8;

c) forming, by converting and maintaining the solid dissolvable composition mixture into the desire shape and size by at least one of crystallization, partial drying, salt addition or viscosity build from liquid crystal formation; and d) drying, by removing water to produce a solid dissolvable composition.

18. The method of claim 17, wherein the freshness benefit agent is added during mixing.

19. The method of claim 17, wherein the freshness benefit agent is added during drying.

* * * * *